(12) United States Patent
Brown et al.

(10) Patent No.: US 7,234,112 B1
(45) Date of Patent: Jun. 19, 2007

(54) PRESENTING QUERY PLANS OF A DATABASE SYSTEM

(75) Inventors: Douglas P. Brown, Rancho Sante Fe, CA (US); Paul L. Sinclair, Manhattan Beach, CA (US); Jeetendra Chaware, Andhra Pradesh (IN)

(73) Assignee: NCR Corp., Dayton, OH (US)

( * ) Notice: Subject to any disclaimer, the term of this patent is extended or adjusted under 35 U.S.C. 154(b) by 1320 days.

(21) Appl. No.: 09/796,289

(22) Filed: Feb. 28, 2001

Related U.S. Application Data

(63) Continuation-in-part of application No. 09/608,976, filed on Jun. 30, 2000.

(51) Int. Cl.
*G06F 3/00* (2006.01)

(52) U.S. Cl. .................. 715/713; 715/853; 715/907

(58) Field of Classification Search ........... 345/708, 345/712, 713, 771, 776, 853–855; 707/10–11, 707/200, 101–103; 715/712, 713, 771, 776, 715/853, 854, 855, 907
See application file for complete search history.

(56) References Cited

U.S. PATENT DOCUMENTS

| | | | |
|---|---|---|---|
| 4,937,036 A * | 6/1990 | Beard et al. ................ 345/156 |
| 5,303,383 A | 4/1994 | Neches et al. | |
| 5,640,584 A | 6/1997 | Kandasamy et al. | |
| 5,844,554 A * | 12/1998 | Geller et al. ................ 345/744 |
| 5,864,842 A | 1/1999 | Pederson et al. | |
| 5,872,904 A | 2/1999 | McMillen et al. | |
| 5,884,299 A | 3/1999 | Ramesh et al. | |
| 5,966,712 A * | 10/1999 | Sabatini et al. ........... 707/104.1 |
| 6,067,542 A | 5/2000 | Carino, Jr. ...................... 707/4 |
| 6,414,307 B1 | 7/2000 | Jones et al. ................. 707/525 |
| 2002/0070953 A1* | 6/2002 | Barg et al. .................. 345/700 |

OTHER PUBLICATIONS

Oracle Corporation, "SQL Language: Reference Manual, Version 6.0," pp. 5-1 to 5-5, 5-96 to 5-97 (1990).
D.D. Chamberlin et al., "Views, Authorization, and Locking in a Relational Data Base System," National Computer Conference, pp. 425-430 (1975).

(Continued)

*Primary Examiner*—Weilun Lo
*Assistant Examiner*—Truc Chuong
(74) *Attorney, Agent, or Firm*—Trop, Pruner & Hu

(57) ABSTRACT

An execution plan of a query for a parallel database system is determined. In one arrangement, the parallel database system is a relational database management system. The execution plan of the query is determined by an optimizer program. Execution plans are inserted into one or more explain tables that are accessible by a visual explain and compare module to display the steps of the execution plan in a graphical user interface. Parallel execution of steps of the execution plan can be depicted in the graphical user interface. Further, plural execution plans for a given query under different conditions may be compared.

31 Claims, 41 Drawing Sheets

OTHER PUBLICATIONS

D.D. Chamberlin et al., "Sequel 2: A Unified Approach to Data Definition, Manipulation, and Control," IBM Journal of Research and Development, vol. 20, pp. 560-575 (Nov. 1976).

M.W. Blasgen et al., "On the Evaluation of Queries in a Relational Data Base System," IBM Research Report RJ 1745, pp. 1-44 (Apr. 1976).

M.W. Blasgen et al., "Storage and Access in Relational Data Bases," IBM Systems Journal, No. 4, pp. 363-377 (1977).

P. Griffiths Selinger et al., ACM, "Access Path Selection in a Relational Database Management System," pp. 23-34 (1979).

Masaru Kitsuregawa et al., Institute of Industrial Science, University of Tokyo, "Query Execution for Large Relations on Functional Disk System," pp. 159-167 (1989).

Eugene Wong et al., ACM Transactions on Database Systems, vol. 1, No. 3, "Decomposition-A Strategy for Query Processing," pp. 223-241 (Sep. 1976).

* cited by examiner

FIG. 10

SPOOL REUSAGE: QID 1, Database:qcd, Server:satyam3 — 472

| Spool Name | Refrence Step | Description | Page |
|---|---|---|---|
| SPOOL 1 | Step 10 | Target | Page - 3 |
| SPOOL 3 | Step 4.1 | Target | Page - 1 |
| SPOOL 3 | Step 5 | Source 2 | Page - 1 |
| SPOOL 4 | Step 4.2 | Target | Page - 1 |
| SPOOL 4 | Step 5 | Source 1 | Page - 1 |
| SPOOL 4 | Step 6.1 | Target | Page - 1 |
| SPOOL 5 | Step 6.1 | Source 1 | Page - 2 |
| BPOOL 5 | Step 7 | Source 1 | Page - 2 |
| BPOOL 6 | Step 6.2 | Source 2 | Page - 2 |
| BPOOL 6 | Step 9 | Target | Page - 2 |
| BPOOL 7 | Step 8 | Source 1 | Page - 2 |
| BPOOL 7 | Step 9 | Source 1 | Page - 2 |
| BPOOL 8 | Step 7 | Source 2 | Page - 2 |
| BPOOL 8 | Step 8 | Target | Page - 2 |
| BPOOL 9 | Step 9 | Target | Page - 2 |
| BPOOL 9 | Step 10 | Source 1 | Page - 2 |

FIG. 36

| Base Query | 1 | ,800 | | Current Query | 6 | ,802 | |
|---|---|---|---|---|---|---|---|
| Step | Parallel Step | Cost | MaxCost | Step | Parallel Step | Cost | MaxCost |
| 5 | 0 | 00:00:00.36 | 00:00:00.36 | ? | ? | ? | ? |
| 6 | 0 | 00:00:00.43 | 00:00:00.43 | ? | ? | ? | ? |
| 7 | 0 | 00:00:00.37 | 00:00:00.37 | 7 | 0 | 00:00:00.36 | 00:00:00.36 |
| ? | ? | ? | ? | 8 | 1 | 00:00:00.43 | 00:00:00.43 |
| ? | ? | ? | ? | 8 | 2 | 00:00:00.36 | 00:00:00.36 |
| ? | ? | ? | ? | 9 | 1 | 00:00:00.43 | 00:00:00.43 |
| ? | ? | ? | ? | 9 | 2 | 00:00:00.39 | 00:00:00.39 |
| ? | ? | ? | ? | 10 | 0 | 00:00:00.72 | 00:00:00.72 |

PRESENTING QUERY PLANS OF A DATABASE SYSTEM

CROSS-REFERENCE TO RELATED APPLICATION

This is a continuation-in-part of U.S. Ser. No. 09/608,976, filed Jun. 30, 2000.

TECHNICAL FIELD

The invention relates to presenting query plans of a database system.

BACKGROUND

In relational database management systems (RDBMS), users querying the database need not specify how to access the data, but only what data is desired. One of the goals of a database management system is to optimize the performance of queries for access and manipulation of data stored in the database. This is accomplished by use of an optimizer program. Given a query, the optimizer program generates several alternative plans for accessing the requested data. The execution cost of each alternative is estimated and the optimum execution plan is selected to access the data in an efficient manner.

Conventionally, database management systems provide a mechanism for a user to view the execution plan for a given query. In some systems, to view the steps of the execution plan for a given query, such as one selected by an optimizer program, an SQL (Structured Query Language) Explain statement is issued. In some systems, the query execution plan is presented in text format.

The complexity of a query execution plan is related to the size and complexity of the database management system. For example, in data warehousing systems (such as the TERADATA® system from NCR Corporation), the platforms used to run the database management software are multi-node parallel processing systems having tens or even hundreds of nodes (sometimes referred to as massively parallel processing or MPP systems). The amount of data stored frequently exceeds tens or hundreds of gigabytes and in many cases is in the terabyte range. As the complexity of the system increases, the complexity of the execution plans for a given query also increases.

Presenting a query execution plan in text format is often sufficient for relatively simple and straightforward execution plans. However, as the complexity of the execution plans grows, a more sophisticated mechanism is needed to depict query execution plans.

SUMMARY

In general, a system comprises a graphical user interface and a controller adapted to determine steps of an execution plan in a parallel database system. The controller is adapted to further display a graphical representation of a parallel execution of the steps of the query execution plan in the graphical user interface.

Other or alternative features will become apparent from the following description, from the drawings, and from the claims.

BRIEF DESCRIPTION OF THE DRAWINGS

FIGS. 4-28 illustrate various screens to enable the visual explain of one or more query execution plans in accordance with an embodiment.

FIGS. 29-38 illustrate various screens to enable the visual compare of two or more query execution plans in accordance with an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with some embodiments, a visual explain and compare feature allows a user to view steps of an execution plan for a given query in a graphical user interface of a system. In some embodiments, queries are according to the Structured Query Language (SQL) standard. However, queries according to other standards or formats can be employed in further embodiments.

The visual explain and compare feature also allows a user to compare execution plans of a given query under different conditions (e.g., such as execution plans generated by different versions of an optimizer program). The visual explain and compare feature is provided by a visual explain and compare component executable in the system, which can be a test system or a target (or customer) system. When executed on a target system, the visual explain and compare component allows a user at the target system to visually view execution plans as well as compare execution plans of a query under different conditions.

When executed on a test system that is remote from a target (or customer) system, the visual explain and compare component works with execution plans generated in an emulated environment of the target system. Target-level emulation in the test system to emulate the target system is performed by capturing environment information from the target system. An extractor module in the target system extracts the desired target environment information and communicates the environment information to the test system. The captured target environment information is stored in and/or mapped to appropriate tables, files, and other storage locations in the test system. Execution plans are generated based on the emulated environment, with the visual explain and compare component used to visually depict the generated execution plans.

Figure 1:
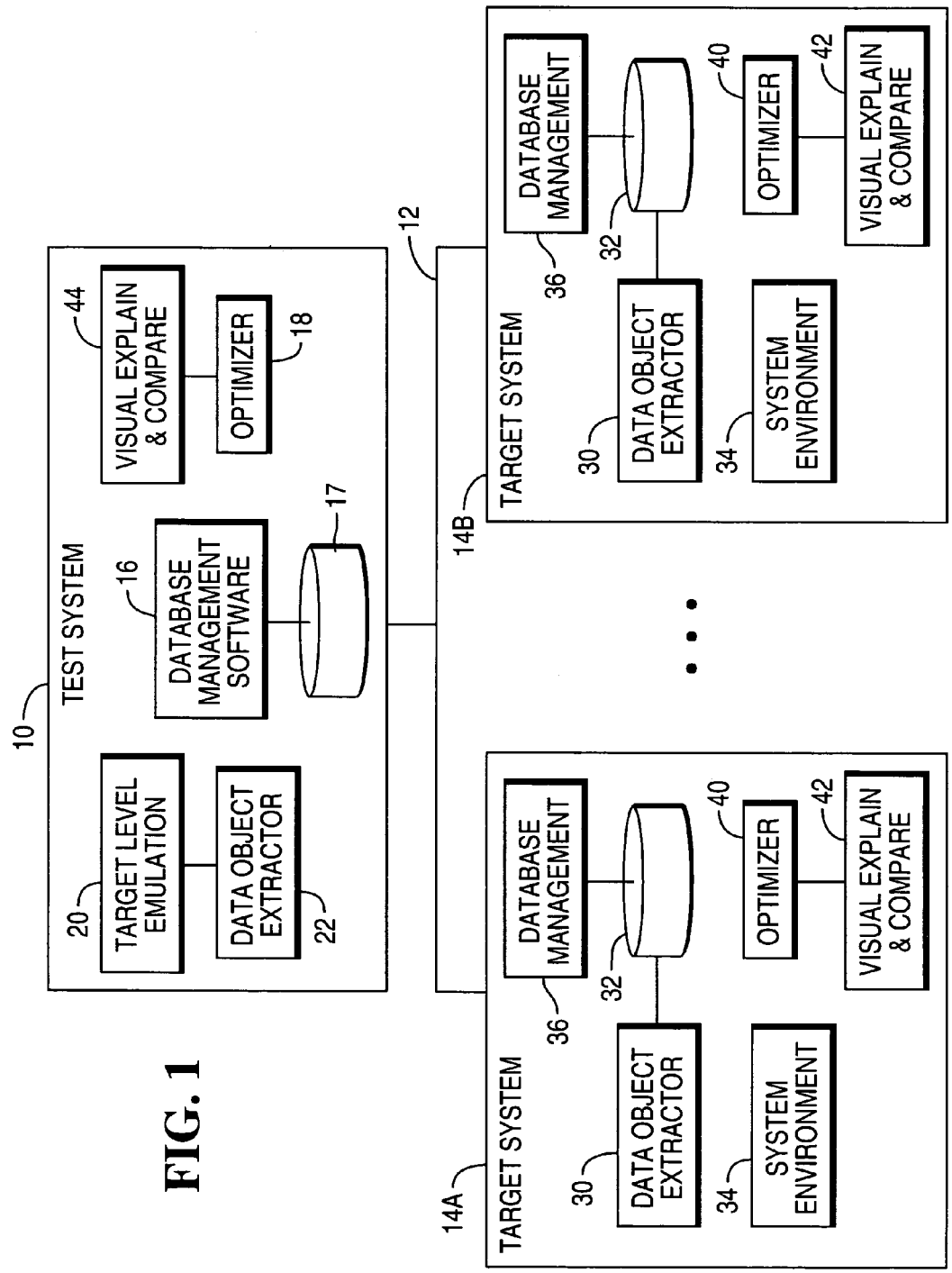
FIG. 1 is a block diagram of plural target systems and a test system, in accordance with an embodiment.

Referring to FIG. 1, several target systems (14A, 14B) are illustrated. Each target system 14 represents a user or customer system on which software, such as relational database system software, is executed. Thus, for example, the target system 14A is located at a first customer site, while the target system 14B is located at a second customer site. In one example, the software running in each target system 14 includes database management software 36, e.g., a data warehouse application, such as the TERADATA® product from NCR Corporation. In each target system 14, the database management software 36 manages access requests to a database 32. In accordance with some embodiments, the database 32 includes a parallel database distributed across plural nodes in each target system 14. Each target system 14 can be a multi-node parallel processing system (sometimes referred to as a massively multiprocessing or MPP system). Alternatively, the target system 14 is a single-node system having plural central processing units or CPUs (sometimes referred to as a symmetric multiprocessing or SMP system).

As used here, a "parallel system" refers to a multi-node multi-processing system, a single-node system having plural CPUs (e.g., an SMP system), or a single-node system running multiple virtual processors on one or more CPUs. A "parallel database system" or "parallel database" refers to a database system or database implemented in the parallel system. In one embodiment, the database system is a relational database system that is part of a data warehouse system containing data from a variety of sources and organized for query, analysis, and reporting.

Each of the target systems 14 includes an optimizer module 40 to optimize execution plans for a given query. The optimizer module 40 generates alternative execution plans for the given query and selects the optimal query plan, which may be the most cost-effective execution plan or one of the more cost-effective execution plans. The optimizer module 40 identifies an execution plan (query plan, join plan, or strategy) that reduces the estimated response time of a given query. The response time is the amount of time it takes to complete the execution of the query on the given target parallel system. One technique of query optimization use is a cost model to estimate the response time of a given query plan and to search the space of query plans to return a plan with a low cost. In the cost-based optimization model, different methods for doing a unit of work is compared and the most efficient method is selected (the plan with the lowest cost). Because the number of alternatives can be quite large, especially in a parallel system with a large number of nodes running a large relational database, the query optimizer module 40 uses statistics and/or sampling techniques to reduce the search space in optimizing queries.

The query execution plans selected by the optimizer 40 can be stored in the target system 14, with the execution plan accessible by a visual explain and compare module 42 to graphically depict or display the execution plan. The visual explain and compare component 42 provides a graphical user interface in which steps of the execution plan can be displayed. Each step of the execution plan can be depicted as an icon, with the icons connected by lines to represent the flow of the steps in the execution plan. The icons are designed to represent objects such as relational algebra (e.g., select, project, join); physical algebraic operators such as nested join, merge join, hash join, and so forth; tables; sorts; redistribution; views; duplications; and other objects.

Another feature of the visual explain and compare module 42 is the ability to compare plural execution plans for a given query, with the plural execution plans generated under different conditions. This provides the user with the ability to analyze differences between different execution plans, which may result if software, such as the optimizer module 40, has been modified to a newer version. With the compare feature, the execution plans generated by different versions of the optimizer module 40 may be compared to ensure that inadvertent problems have not been introduced due to the modification, which may cause system crashes or sub-optimal execution of queries. Execution plans of a given query can also change in response to differences in other conditions, such as differences in the database management system, differences in the platform on which the database management system is executed, differences in other software (e.g., applications, operating systems), different contents of tables, and so forth.

Each target system 14 comprises a system environment 34, which is made up of system-specific information as well as database-level information of each target system. As used here, "environment information" of a target system refers to the system-specific information, database-level information, or any portion of the system-specific or database-level information. System-specific information includes such information as the number of nodes in the target system, the number of CPUs per node, the number of virtual processors in each node, and other system information. Database-level information includes statistics, data manipulation language (DML) statements, data definition language (DDL) statements, and the actual data of the database itself. Statistics include information on how data is structured in the database, the number of rows in a table, the data demographics of a table, and highest and lowest values of a column. Statistics may be sampled randomly from each node of a target system. DDL statements affect the structure of database objects, and may include statements such as SQL ALTER statements (to redefine or alter databases, tables, indexes, etc.), CREATE statements (to create databases, indexes, tables, etc.), and so forth. DML statements are statements that manipulate data, such as the COMMIT statement (to make permanent all changes since the beginning of a transaction), DELETE statement (to remove rows from a table), INSERT statement (to add new rows to a table), SELECT statement (to perform a query by selecting rows and columns from one or more tables), UPDATE statement (to change data in a table), and so forth.

For remote testing of various features of target systems, the environment information of a target system is captured and communicated to a test system 10 coupled over a data network 12. Examples of the data network 12 include private networks (e.g., local area networks or wide area networks) or public networks (e.g., Internet).

To capture the environment of a target system 14 for the purpose of emulation, environment information is extracted in the target system and communicated over the network 12 to the test system 10. Each target system 14 includes a data object extractor 30 to extract desired environment information. The data object extractor 30 captures system-specific information (also referred to as cost-related information) and database-level information from the corresponding target system 14 and communicates the captured environment information to the test system 10. The data object extractor 30 in each target system 14 cooperates with a data object extractor 22 in the test system 10. The communication of the extracted data may be performed in a number of different ways, e.g., sent by electronic mail, sent by file transfer, downloaded from a web site, and so forth.

In some embodiments, the data object extraction process occurs in two phases. First, the data object extractor 30 in the target system 14 dumps target environment information (including cost-related information, statistics, DDL statements, DML statements, actual database data) from each target system 14 to the test system 10. After the target environment information is copied from the data object extractor 30 to the test system 10, a second process, referred to as an "apply process," is performed in which the data received from the target system 14 is loaded and/or mapped into appropriate tables or system files in the test system 10. The target environment information that has been loaded into the test system 10 is referred to as target-level emulation data 20. The loading and applying process is performed by the data object extractor 22 running inside the test system 10 (in cooperation with the data object extractor 30 in each target system 14).

The test system 10 further includes an optimizer module 18 for optimizing queries to a database 17 managed by database management software 16 running in the test system 10. For more accurate performance determinations, the optimizer module 18 uses target-level emulation data 20 that has been communicated from a target system 14 to the test system 10. Based on the target-level emulation data 20, the optimizer module 18 selects the most efficient query (or lowest cost) execution plan for a given query in the test system 10. Hooks in the optimizer module 18 enables the optimizer module 18 to access information stored in databases and tables containing the target-level emulation data 20.

The test system 10 also runs a visual explain and compare module 44 that is similar to the visual explain and compare module 42 in each target system 14. The visual explain and compare module 44 in the test system 10 is able to graphically display the execution plans selected by the optimizer module 18 based on the target-level emulation data 20.

Although the presence of the test system 10 enables remote testing of query plan generation based on an emulated target environment in some embodiments, the test system 10 is not necessary in other embodiments. The visual explain and compare module (42, 44) can be executed in any system in which visualization and/or comparison of query execution plans is desired. In addition, although reference is made to visual explain and compare modules in this description, the present invention is not limited to embodiments in which both the visual explain and the visual compare features are implemented, as the compare feature may be omitted in some embodiments.

Figure 2:
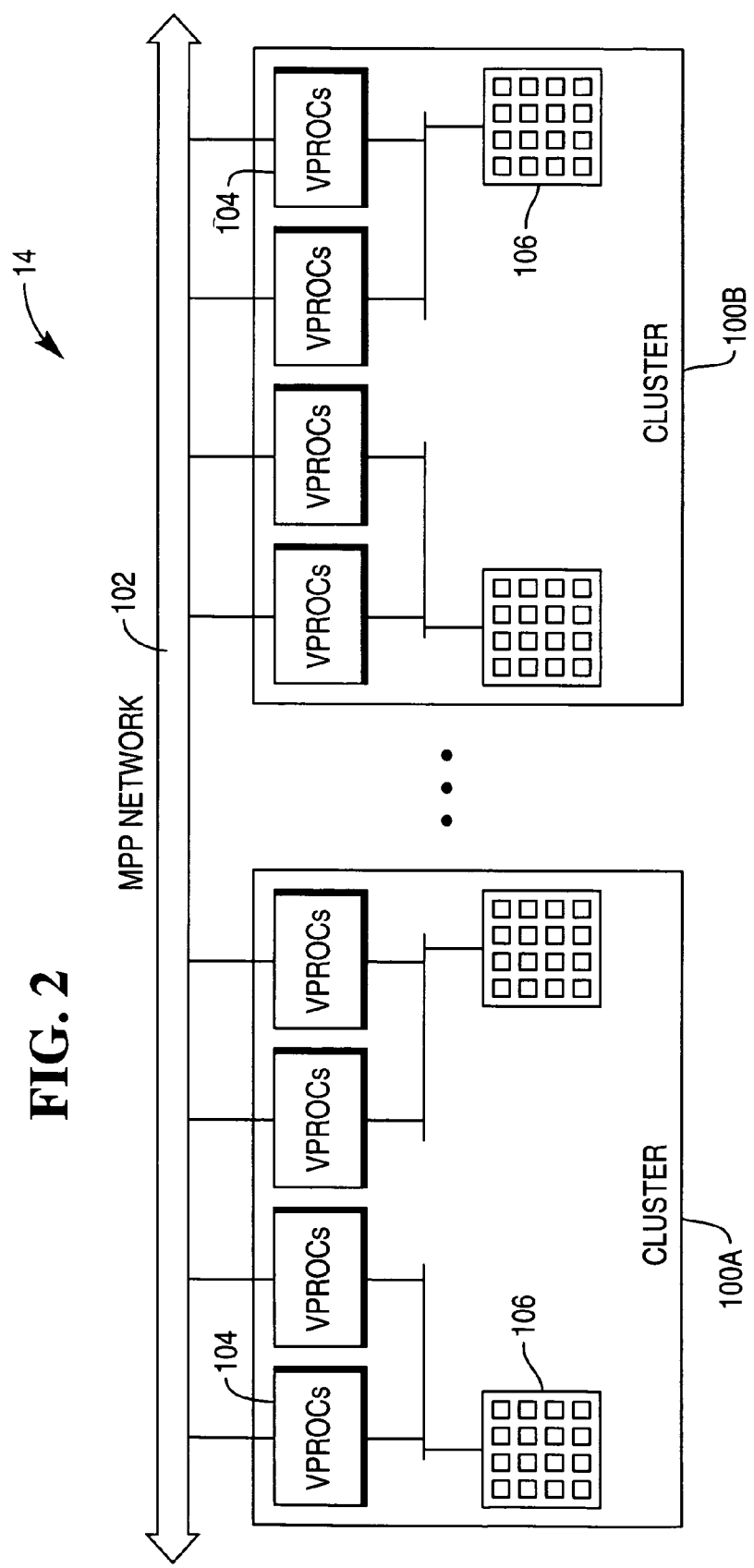
FIG. 2 is a block diagram of an example target system.

Referring to FIG. 2, an example arrangement of a target multi-node parallel system 14 is illustrated. The target system 14 has plural nodes 100A, 100B, and so forth, coupled by an interconnect network 102. Each node may include a single central processing unit (CPU) or multiple CPUs.

In addition, as illustrated in FIG. 2, each node 100 includes multiple virtual processors (VPROCs) 104, which include parsing engines (PEs) and virtual access module processors (VAMPs). More than one PE or VAMP can run in each node. PEs handle access requests, which are in the form of SQL statements, and generates steps that are performed in one or more VAMPs. Each VAMP is responsible for a logical disk space, referred to as a virtual disk, which includes one or more storage devices 106. The concept of VPROCs and virtual disks enable a larger amount of parallelism in the parallel system 14.

In further embodiments, plural VPROCs, such as PEs and VAMPs, are also executable in a single-node multiprocessing system such as an SMP system. In the single-node system, plural VPROCs are distributed across plural central processing units (CPUs) of the system. Thus, more generally, multiple virtual processors responsible for handling access requests to a parallel database are executable in a system. As used here, a "parallel system" refers to a multi-node parallel processing system, a single-node multiprocessing system with multiple CPUs, or a single-node system with a single CPU running multiple virtual processors.

Figure 3:
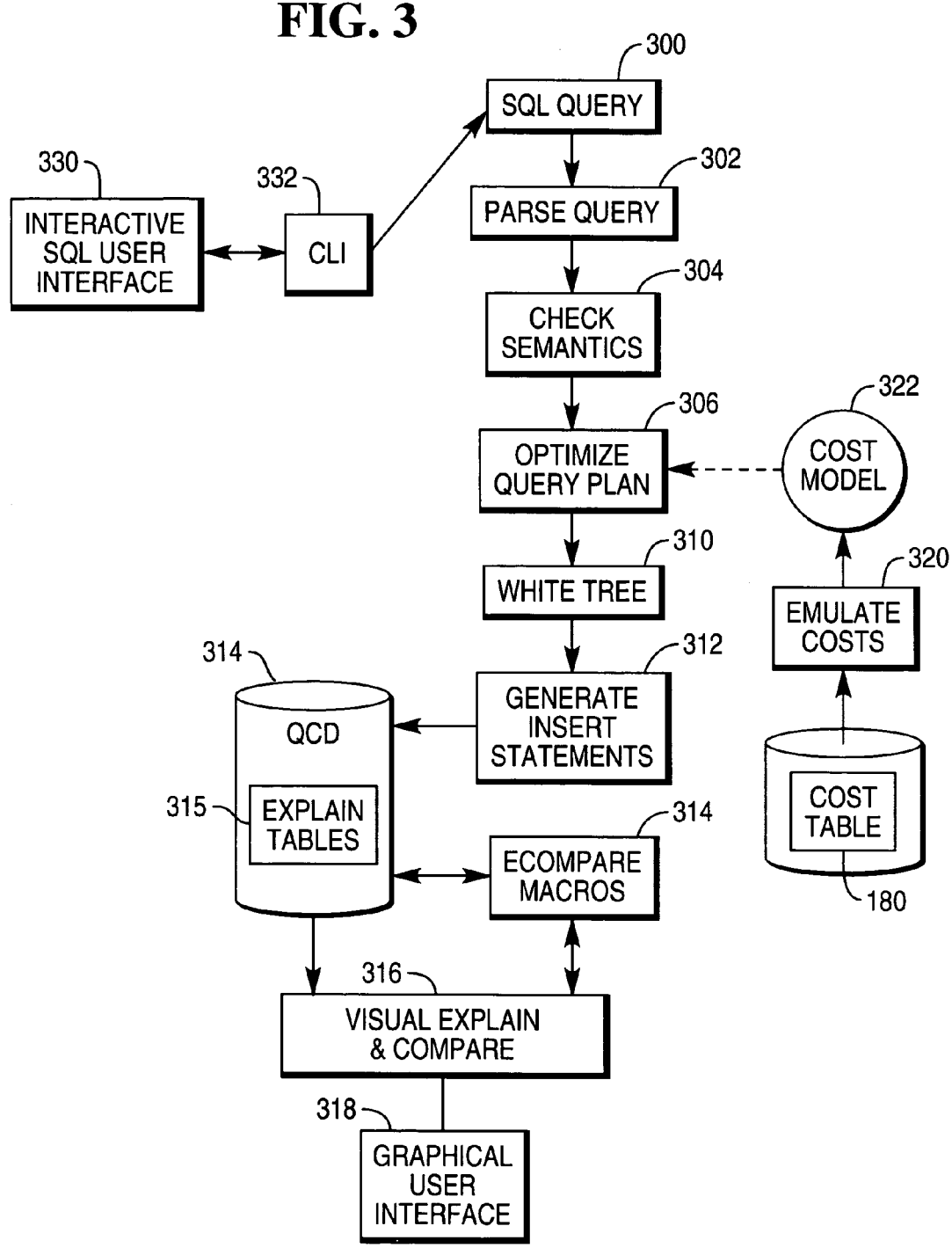
FIG. 3 illustrates generally a process of providing a visual explain and compare capability in accordance with an embodiment.
Figure 4:
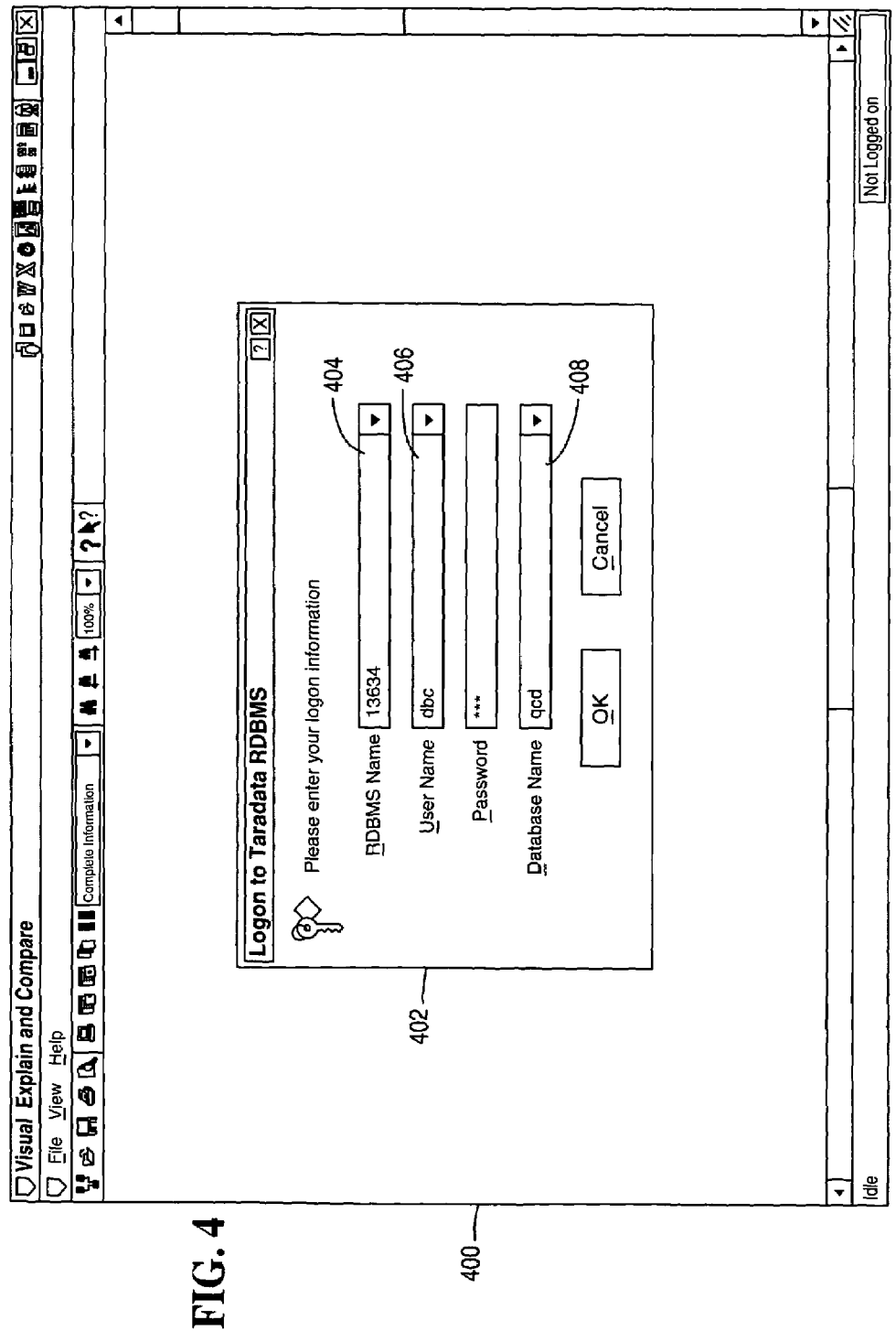

Referring to FIG. 3, generation, processing, optimizing, and viewing of the execution plan associated with a query are illustrated. Through an interactive SQL user interface 330, a user is able to specify SQL statements to submit to the optimizer module (40, 18) for optimization. The interactive SQL user interface 330 issues an SQL query through an SQL call level interface (CLI) 332, which in one embodiment is the SQL/CLI programming call level interface to SQL databases. An SQL query 300 issued through the interactive SQL user interface 330 and the CLI 332 is parsed (at 302) by a parser. Semantics of the query are checked (at 304). The parsed query is then forwarded to the optimizer module (40, 18), where the query is optimized (at 306) to identify the most efficient (or lowest cost) execution plan. The execution plan generated by the optimizer module (40, 18) in one embodiment is in a tree structure, referred to as a white tree 310.

In response to generation (at 312) of INSERT statements, execution plans in the white tree 310 are inserted into one or more explain tables 315 (relational tables) in a query capture database 314. Through ECompare macros 314, a visual explain and compare module 316 (corresponding to either the module 42 or 44) can access execution plans stored in the explain tables 315 for display in a graphical user interface 318.

If the process depicted in FIG. 3 is performed in a target system 14, then the optimization by the optimizer module 40 is performed in an actual target system environment. However, if the process of FIG. 3 is performed in the test system 10, then a cost table 180 stored in the test system is accessed to emulate costs (at 320) to provide a cost model 322 that is accessed by the optimizer module 18 to optimize (at 306) a query plan. Generation of the cost table 180 is further described below.

The visual explain and compare module 316 uses a set of defined icons to graphically depict an execution plan generated by the optimizer module 316 in the graphical user interface 318. Example icons that are displayable in the graphical user interface 318 include a Select icon, which represents the SQL SELECT statement to return rows in the form of a result table. An INSERT icon represents an SQL INSERT statement that inserts a row into a result table. A DELETE icon represents a DELETE statement that deletes one or more rows from a result table. An UPDATE icon represents an UPDATE statement that allows a user to modify data in one or more rows of a table.

Various lock step icons are also provided, including a ReadLock icon that represents a lock that is placed when a SELECT statement is performed to restrict access by a user who requires exclusive or write locks. A WriteLock icon represents a write lock that is performed when INSERT, DELETE, and UPDATE statements are performed on a table to restrict access by another user. Other icons may also be defined for other types of locks.

Icons representing retrieval of data are also defined. For example, an AllAMPRetrieve icon represents an all AMP retrieval that is performed if data resides on more than two AMPs. A SingleAMPRetrieve icon represents retrieval of data from a single AMP. A TwoAMPRetrieve icon represents an all AMP retrieval that is performed if data resides on two AMPs. A MultiAMPRetrieve icon represents multi-AMP retrieval when using various hashing combinations.

Icons are also defined to represent data redistribution in the relational database system. A DuplicatedOnAllAMPs icon represents duplication of resultant rows across all AMPs. A Re-DistributedOnAllAMPS icon represents re-distribution of resultant rows across all AMPs. A Locally-BuildOnAllAMPs icon represents locally building resultant rows on all AMPs.

Various icons are also used for representing tables and spools. A Table icon represents the table on which the operation is to be performed. A Spool icon represents a spool where data is temporarily stored. Many other types of icons may also be defined. The types of icons that are desired is implementation specific, with different embodiments employing different types of icons to represent different operations and components of the relational database management system.

Referring to FIGS. 4-28, screens provided by the graphical user interface 318 for the visual explain feature are illustrated. In a main window 400, a pop-up screen 402 is provided to enable the user to log into a selected relational database management system (entered into a field 404) under a user name (entered into a field 406). A database name can be entered into a field 408 to select the database in the database management system to log into. In this case, the selected database is the QCD database 314 (FIG. 3).

Figure 5:
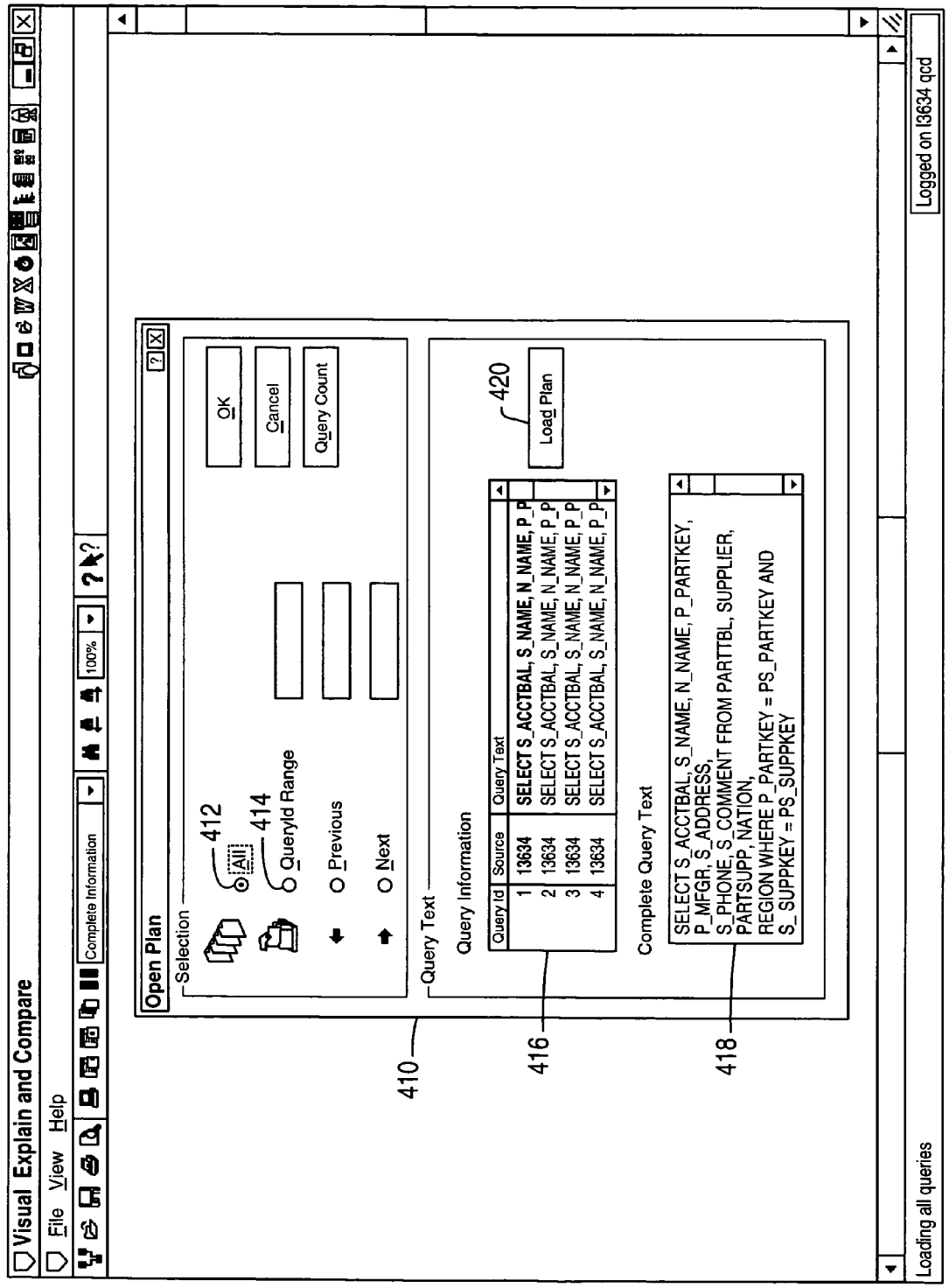

As shown in FIG. 5, after login, a screen 410 is displayed in which a user can select the query execution plans to open. Each query execution plan is stored under a query identifier (ID). The screen 410 provides an item 412 that is selectable to select all query execution plans or another item 414 in which a range of query IDs may be entered by the user to select the desired execution plans. The query execution plans are also listed in a box 416. The query text for the selected query execution plan is displayed in a box 418. Once the one or more query execution plans are selected, then a "Load Plan" button 420 can be selected to load the query execution plan.

Figure 6:
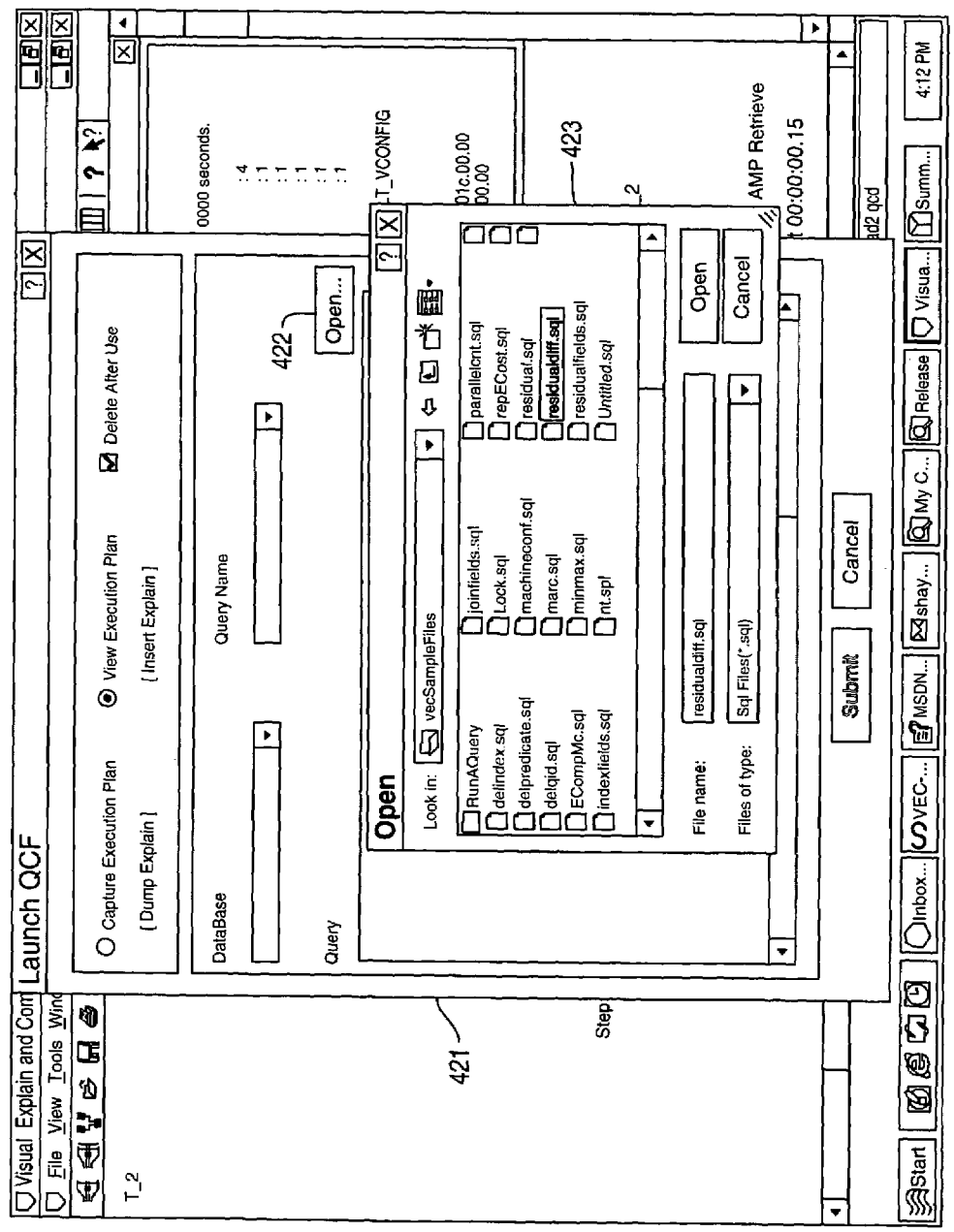

FIG. 6 shows an alternative mechanism of retrieving a query execution plan for viewing. In the example of FIG. 6, a "Launch QCF" screen 421 provides an Open button 422. Selection of the Open button 422 causes a pop-up screen 423 to be displayed, which lists a number of files containing query execution plans. A file is selected to load the query execution plan for viewing. Thus, while the screen 410 of FIG. 5 enables selection of query plans by their ID numbers, the screen 423 of FIG. 6 enables the selection of a file containing an execution plan for display.

Figure 7:
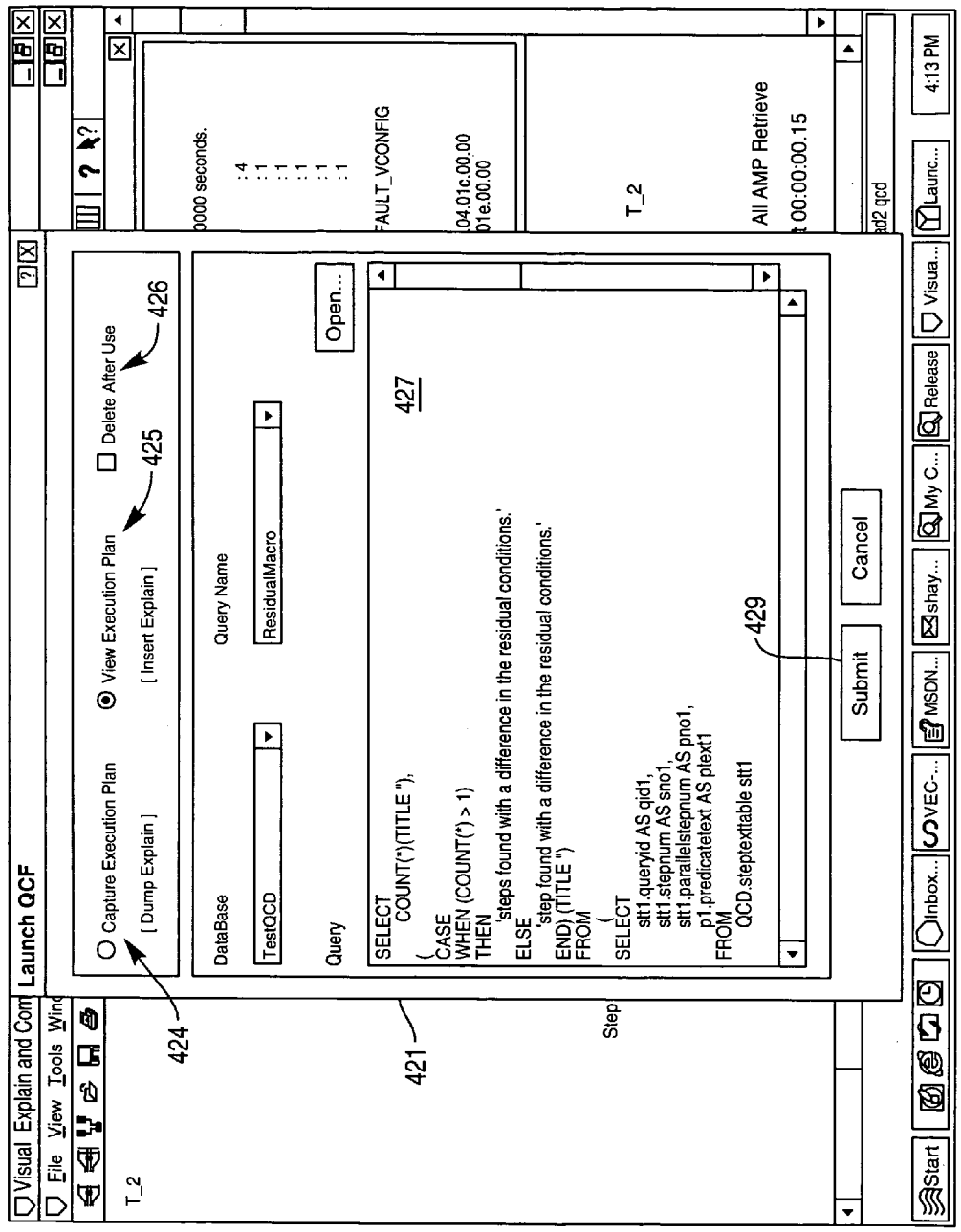

FIG. 7 shows other features of the "Launch QCF" screen 421. The Launch QCF screen 421 includes a "Capture Execution Plan" element 424, a "View Execution Plan" element 425, and a "Delete After Use" element 426. A Query window 427 in the Launch QCF screen 421 shows the text of an SQL statement that has been selected by the user from a file (FIG. 6). In the illustrated example, the View Execution Plan element 425 so that the selected execution plan is displayed when a Submit button 429 is activated by the user (?). If the Capture Execution Plan element 424 is selected, then the execution plan specified in the Query window 427 is captured and stored for later use. Activation of the Capture Execution Plan element 424 is the equivalent of specifying an SQL DUMP EXPLAIN statement, while activation of the View Execution Plan element 425 is the equivalent of an SQL INSERT EXPLAIN statement. The Delete After Use element 426, if activated, causes deletion of the execution plan after use.

Figure 8:
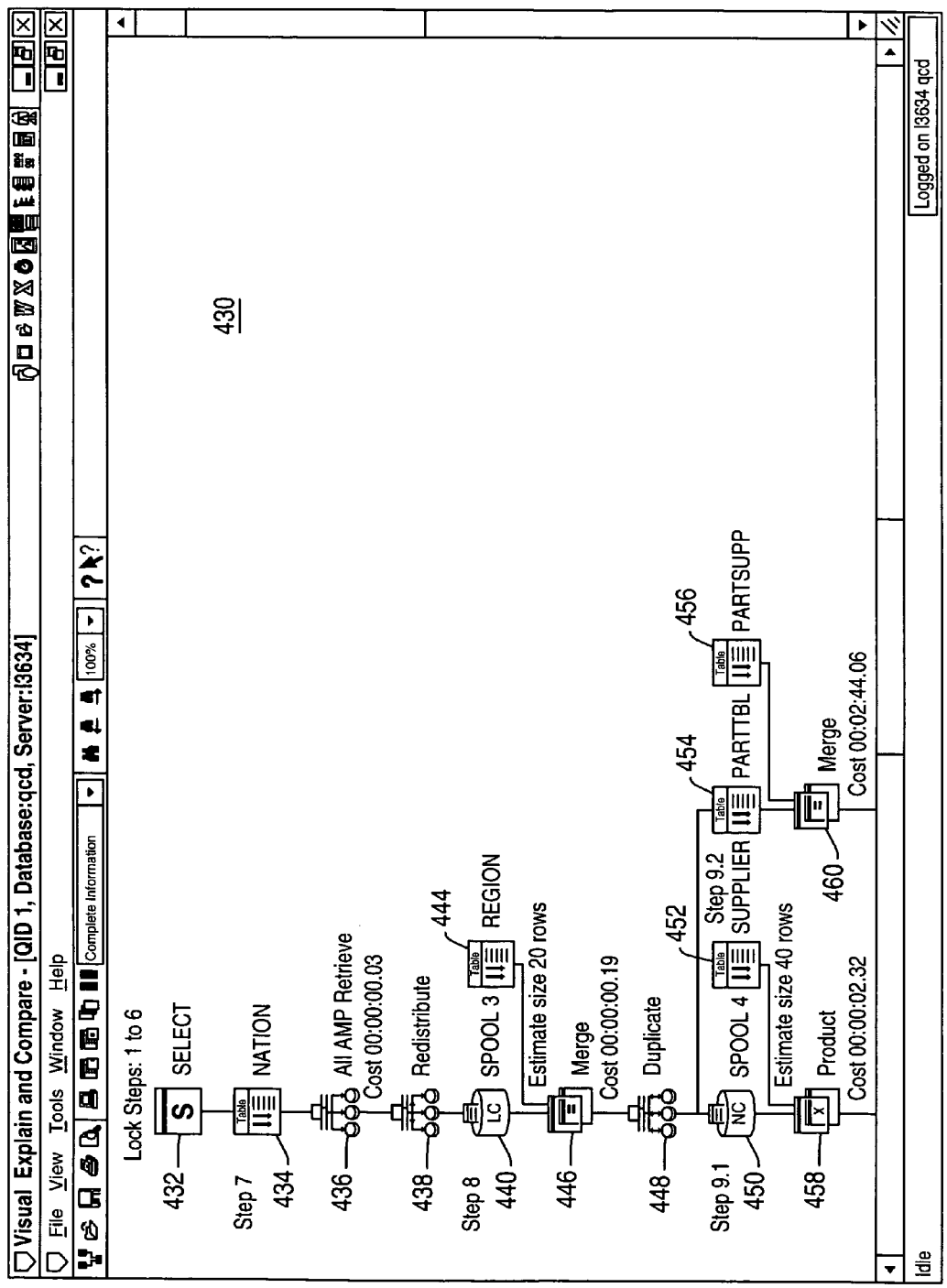

Referring to FIG. 8, a portion of an example query execution plan is shown in a screen 430. The example is provided for illustration purposes; other execution plans of varying degrees of complexity are also displayable by the visual explain and compare module 316. The screen 430 contains various icons that correspond to the operations or components involved in each step of the execution plan. Steps 1 through 6 are lock steps in which six tables are selected, as indicated by the SELECT icon 432. One of the tables selected is the Nation table, represented by the icon 434. Next, an AllAMPRetrieve icon 436 represents retrieval of data from the Nation table 434 residing on more than two AMPs. The cost of the AllAMPRetrieve operation is about 0.3 seconds (00:00:00.03) in the example. Next, a Redistribute icon 438 represents an operation to redistribute a resultant row (created by retrieval of data from the Nation table 434) across all AMPs.

The data generated by the previous operations are temporarily stored in "Spool 3," as represented by a spool icon 440, which represents a temporary storage location, such as on a disk or other storage device. A spool temporarily stores the result of an operation performed on two or more tables. The estimated size of the resultant row stored in Spool 3 is 20 rows. An LC indication is provided in the spool icon 440 to indicate that the estimated size is a "low confidence" estimate.

Next a merge join operation (represented by icon 446) is performed on data stored in Spool 3 and a row from the Region table (represented by icon 444). The estimated cost of the merge join operation is about 0.19 seconds (00:00:00.19). A duplicate operation is then performed (as represented by icon 448) to duplicate the row resulting from the merge join operation across the AMPs. The merge-join resultant row is stored in "Spool 4," as represented by a spool icon 450. The estimated size of the merge-join resultant row is 40 rows, and the spool icon 450 contains an NC indication to indicate that the estimate is a "No Confidence" estimate.

Operations 458 (a relational product join) and 460 (a merge join) are performed in parallel. The product join operation is performed on the resultant row in Spool 4 and a row from a Supplier table (icon 452). The merge join is performed on a row from a PARTTBL table (icon 454) and a PARTSUPP table (456). The estimated cost of the product join operation is about 2.32 seconds (00:00:02.32), and the estimated cost of the merge join operation is about 2 minutes and 44.06 seconds (00:02:44.06).

Figure 9:
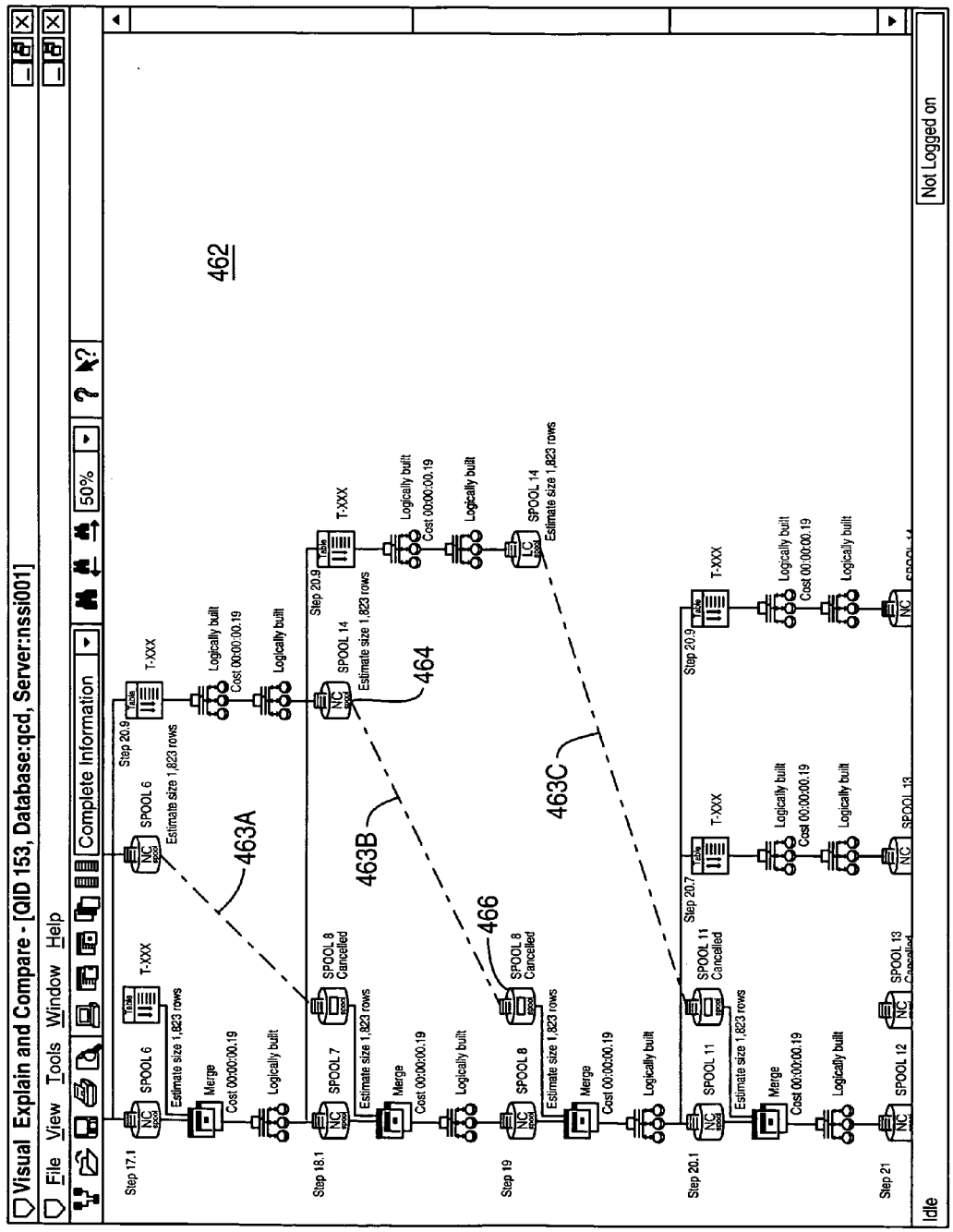

According to another feature, FIG. 9 shows that reused spools can be connected together by an indicator 463, which in the illustrated example are dashed lines 463A, 463B and 463C. A spool can be created for use by a step in an execution of a query. The spool can also be reused by other steps in the execution. Display of the connectors 463 is an option that is selectable by a user. One end of each connector (such as the connector 463B) is connected to a first icon 464, which represents a location in the query execution plan at which the spool is created. The other end of the connector 463B is connected to a second icon 466, which corresponds to another location in the query execution plan at which the spool is reused. Connectors 463A and 463C are similarly connected to two different icons, one representing a location at which the spool is created and the other representing the location at which the spool is reused.

As shown in FIG. 10, one of the options that is selectable by a user is the display of a report on spool reusage in a query execution plan. The report can be in the form of a table 472, which has four columns in the illustrated example. The first column lists the spool names, the second column lists the steps in which corresponding spools are used, a description column indicates whether the spool is a source of a result set generated earlier or a target for storing a result of a view operation performed in the corresponding step. A page column indicates on which page the given spool is located. Note that in one embodiment, the display of a query execution plan is provided on multiple pages if the execution plan is unable to fit within one page. As shown in the example table 472 of FIG. 10, the same spool can appear on multiple rows corresponding to plural steps of the execution plan to represent the reuse of the spool.

Figure 11:
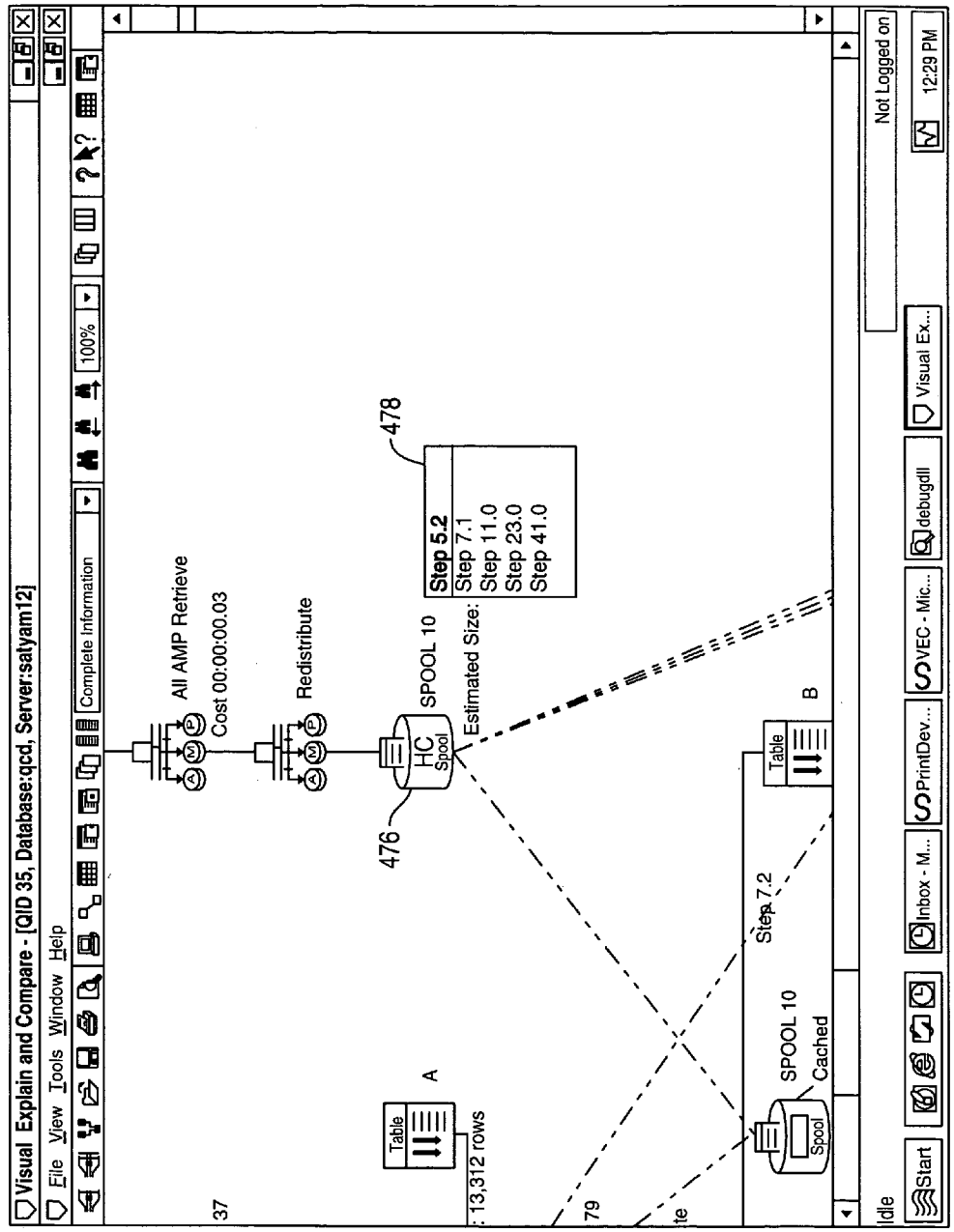

Another feature, as shown in FIG. 11, of some embodiments of the invention is the ability to navigate between different steps using a given spool. For example, in FIG. 11, spool 10 is reused by several steps. If a user clicks on an icon 476 representing spool 10, then the several steps that are using the spool are listed in a pop-up screen 478. A user can then select one of the plural steps to navigate to that step.

Figure 12:
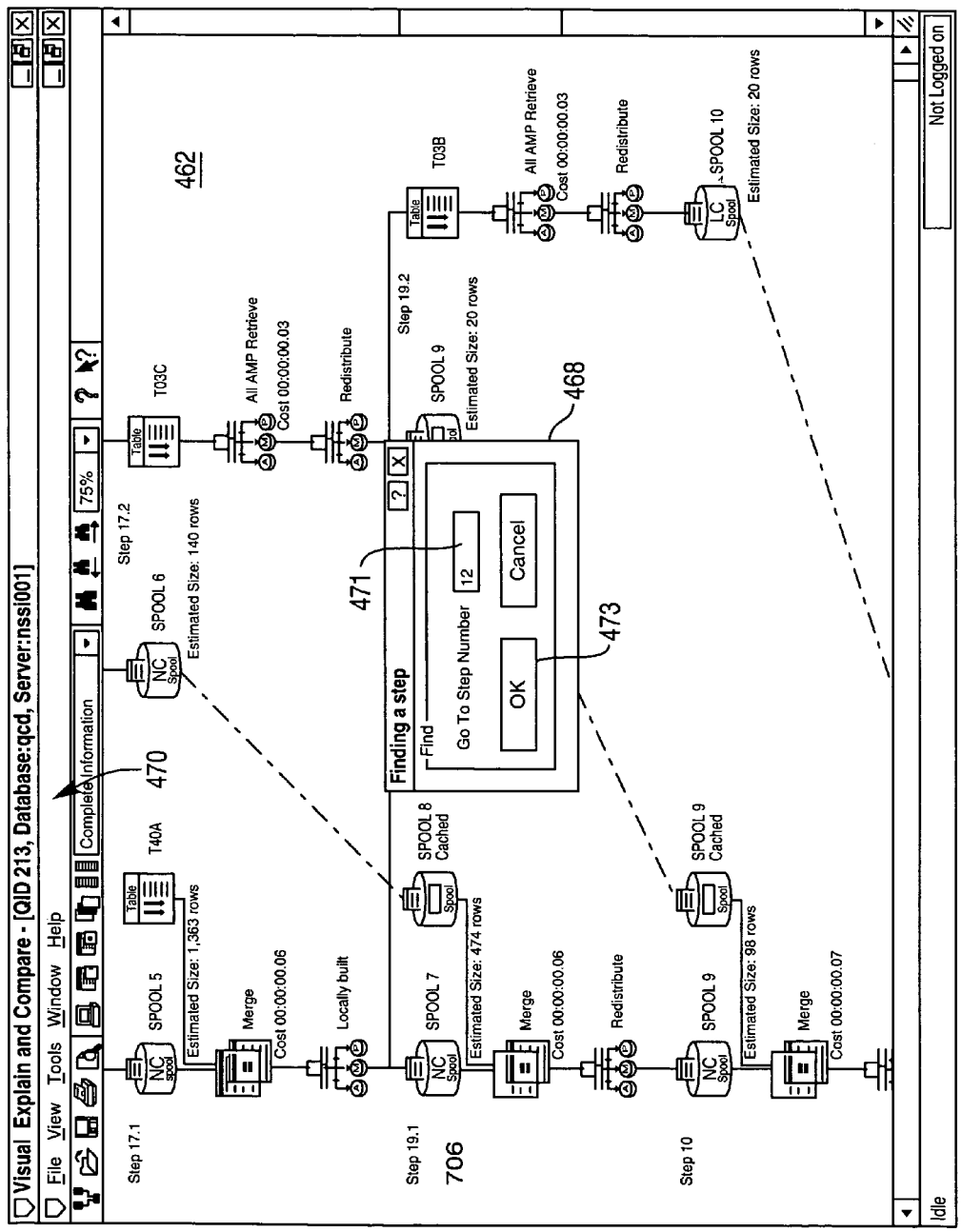

As shown in FIG. 12, if a user desires to go to a specific step, a selection made in the screen 462 (such as on the file menu task bar 470), causes a "Finding A Step" screen 468 to popup. The screen 468 includes a box 471 in which a user can enter a step number. When the user activates the OK button 473 in the screen 468, the screen 462 scrolls to the page in which the requested step is located in.

Figure 13:
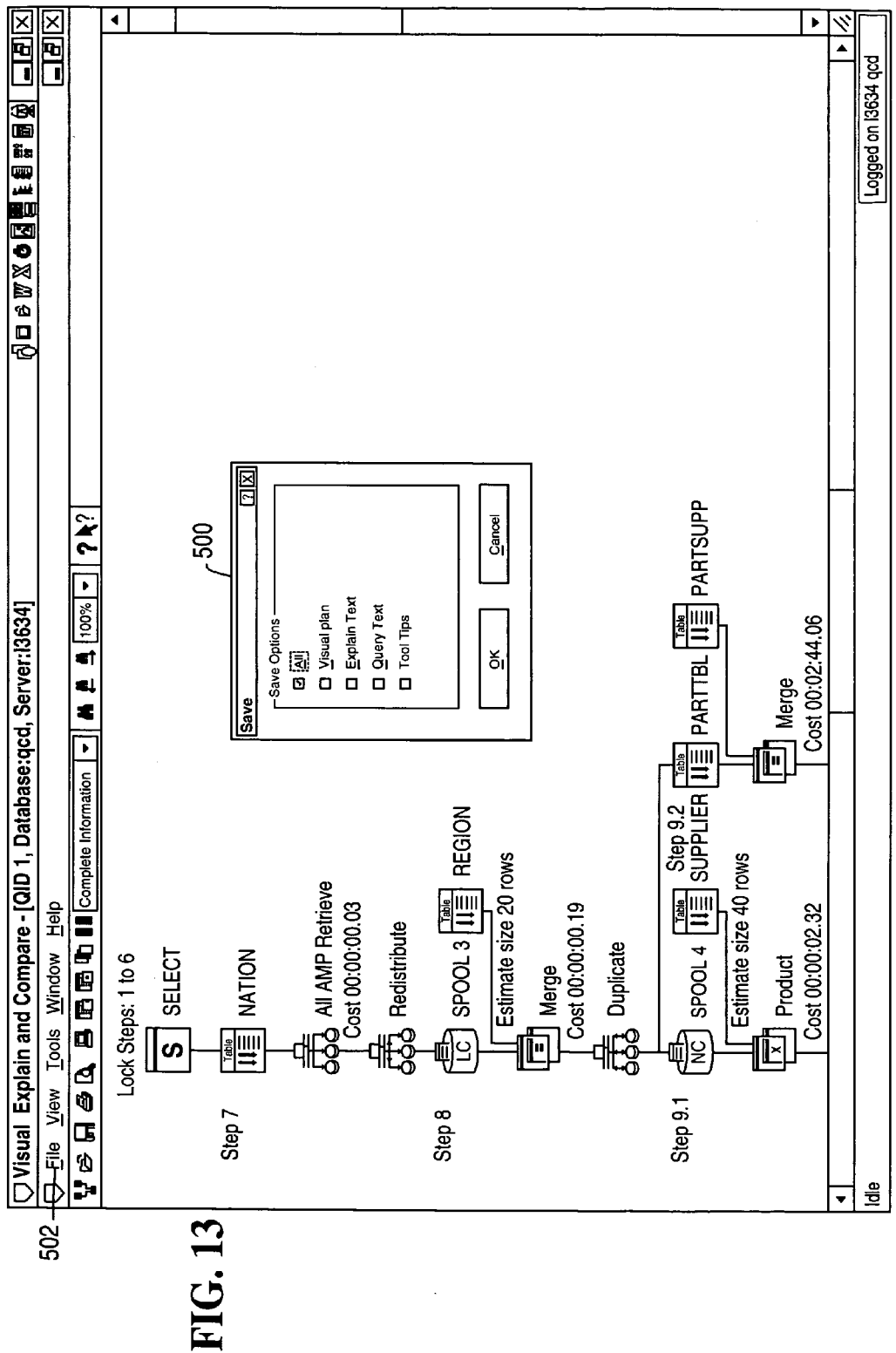
Figure 14:
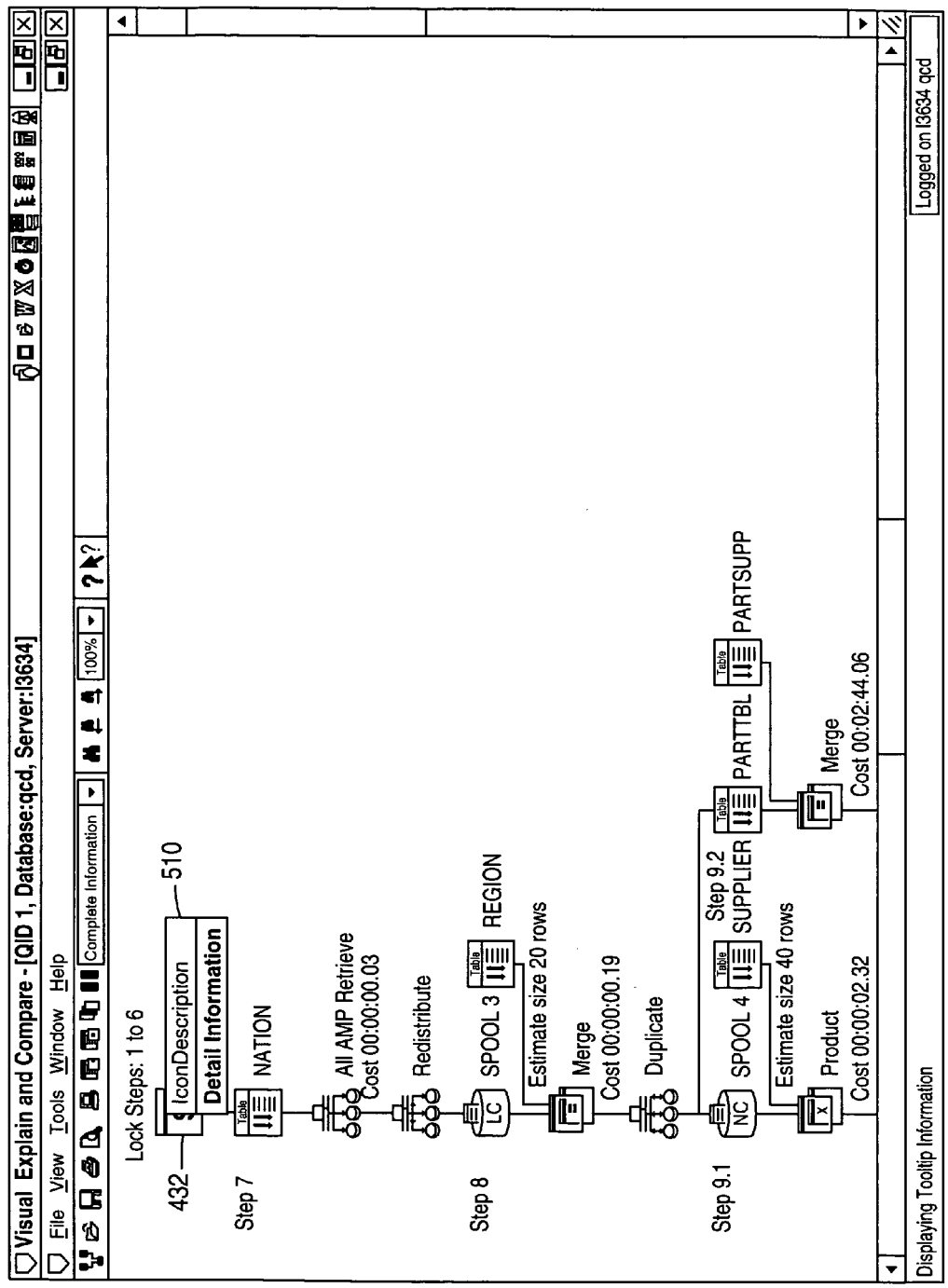
Figure 15:
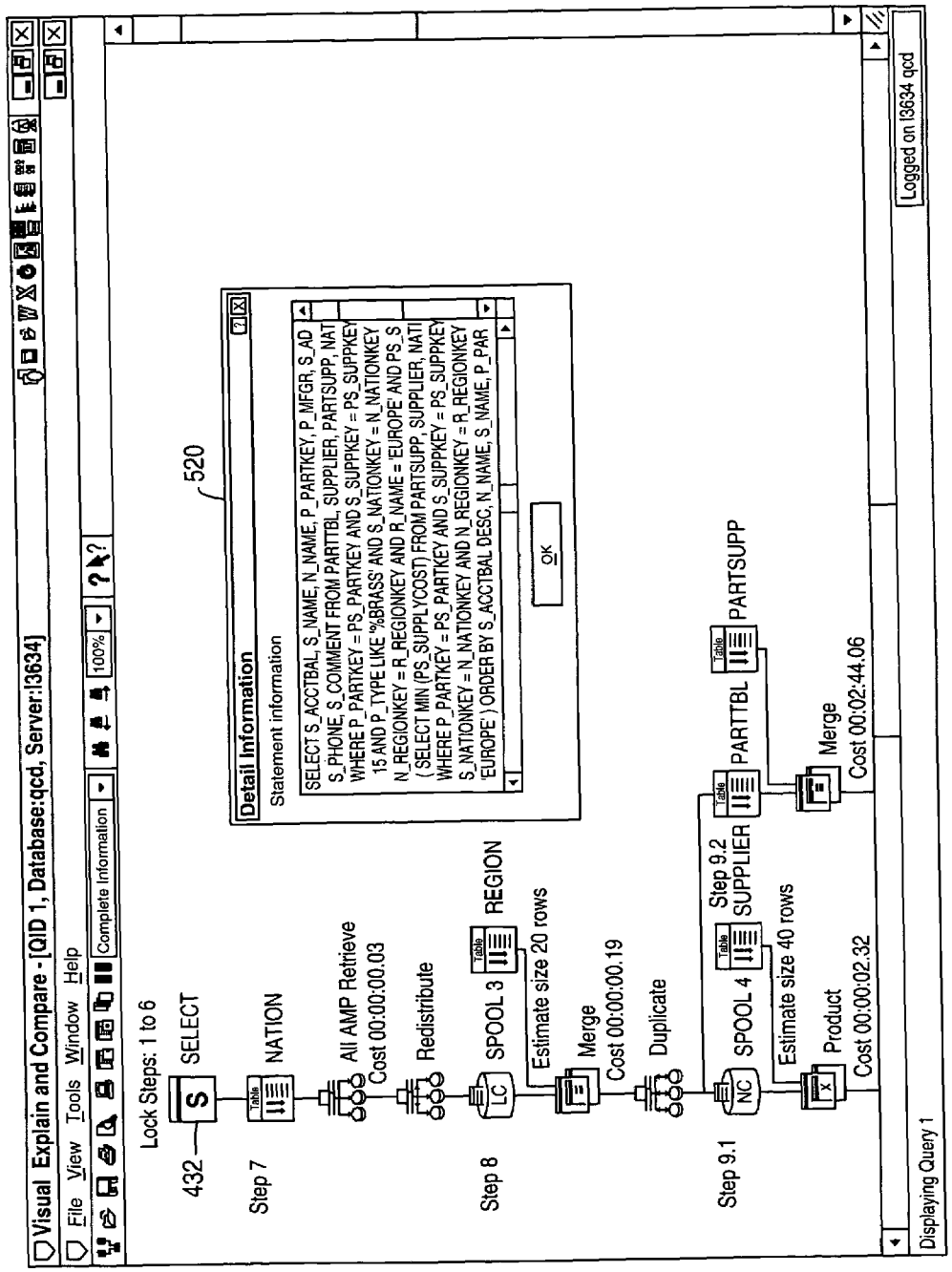

As shown in FIG. 13, the output of the illustrated execution plan (the output of an SQL DUMP EXPLAIN statement) can be saved by selecting the Save command from a File menu 502. In response, a pop-up screen 500 provides several selected options, including an option to save the visual plan (graphical display of the execution plan), the explain text (text description of the execution plan), the query text (text of the query itself), and tool tips (information about each icon). Another option is selectable to save all of the above listed components.

Referring to FIGS. 14-19, information about each of the icons of the displayed query execution plan may be shown. For example, a mouse pointer may be moved to the desired icon, such as the Select icon 432, and the left mouse button clicked. A pop-up screen 510 allows selection of the tool tips description of the icon or detailed information associated with the icon. If detailed information is selected, then a pop-up screen 520 (FIG. 15) is displayed to display detailed information about the icon. In this case, the detailed information displayed is the query text of the SQL Select statement selecting the six tables in the example.

Figure 16:
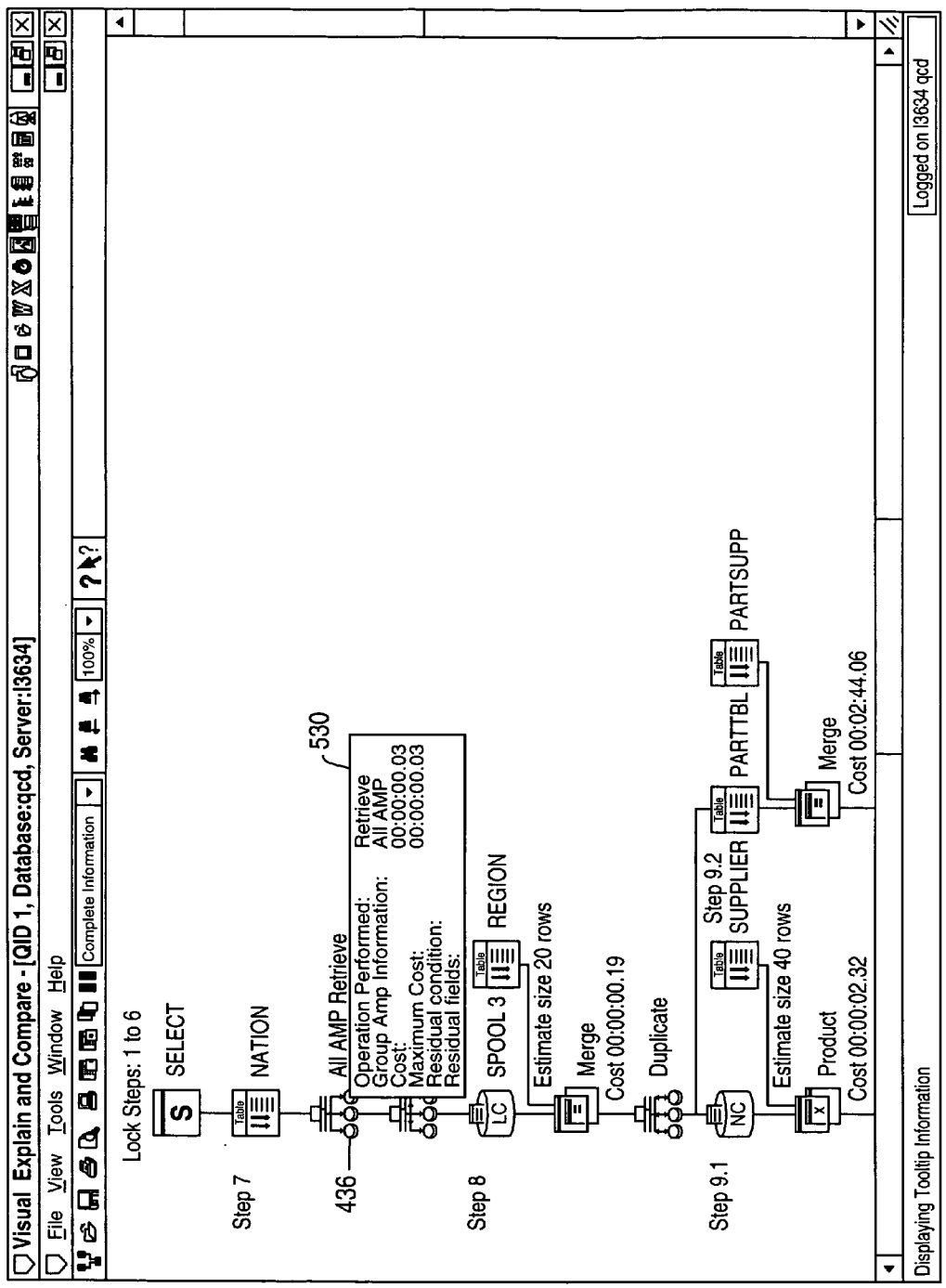
Figure 17:
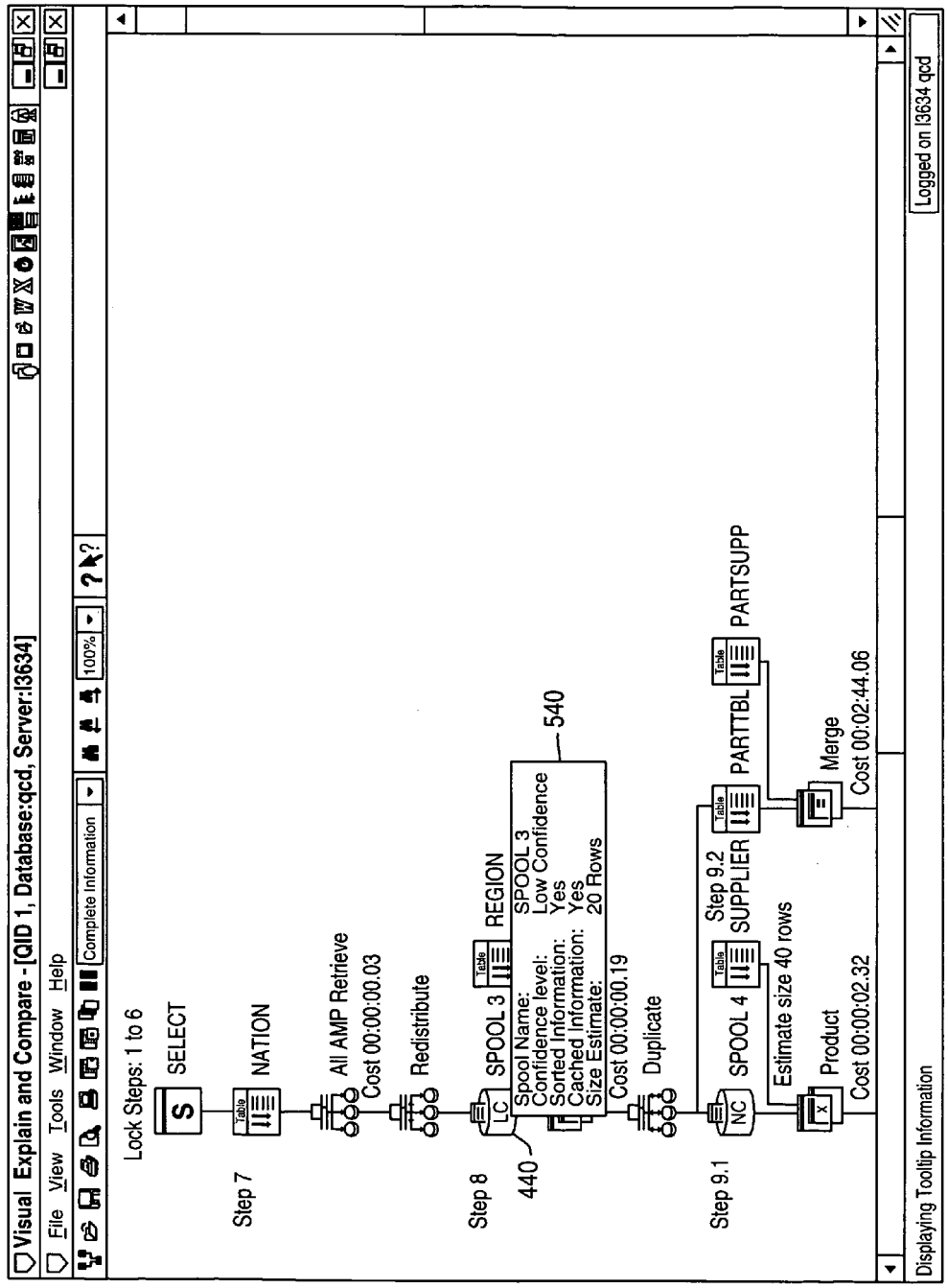
Figure 18:
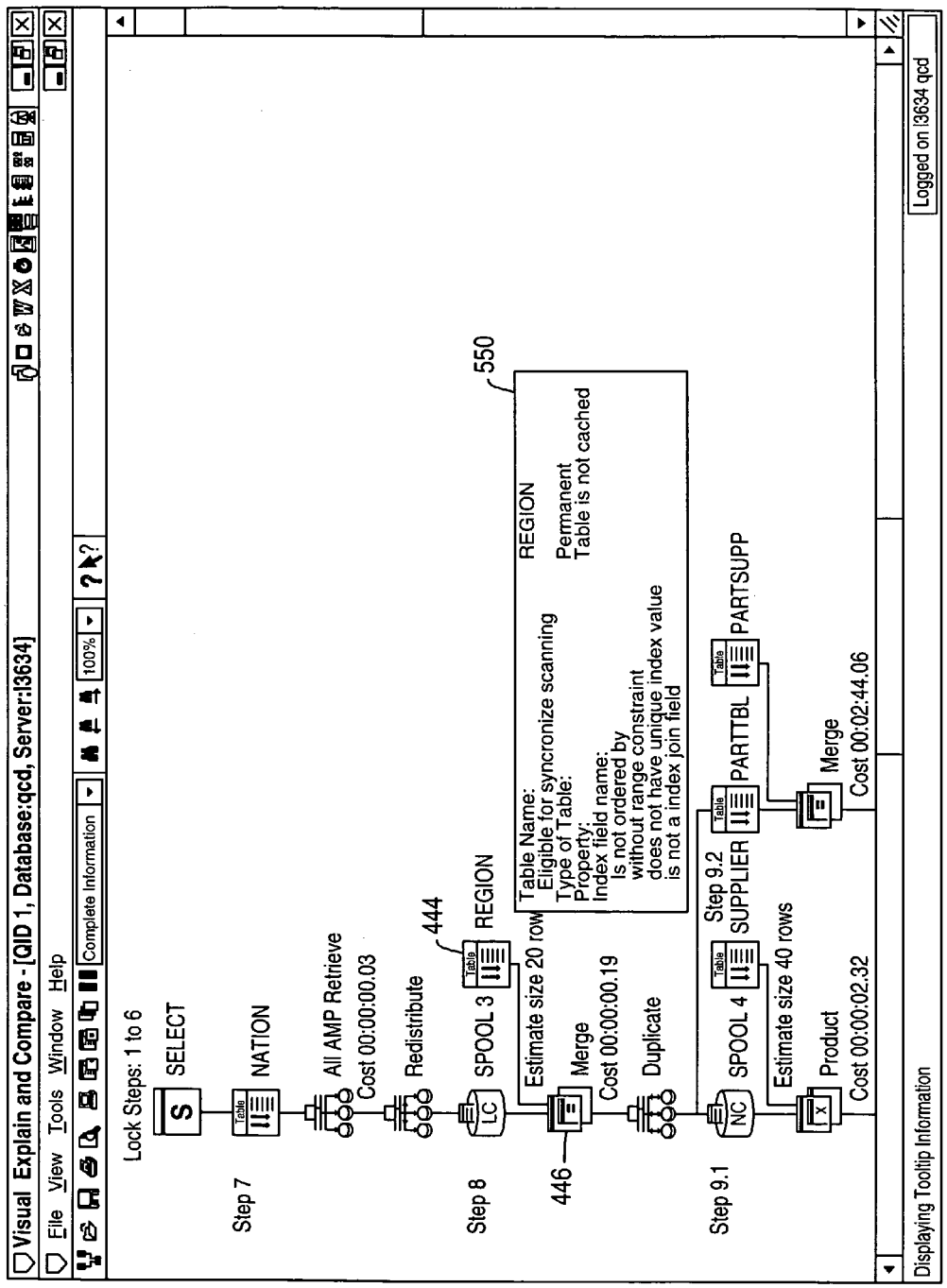
Figure 19:
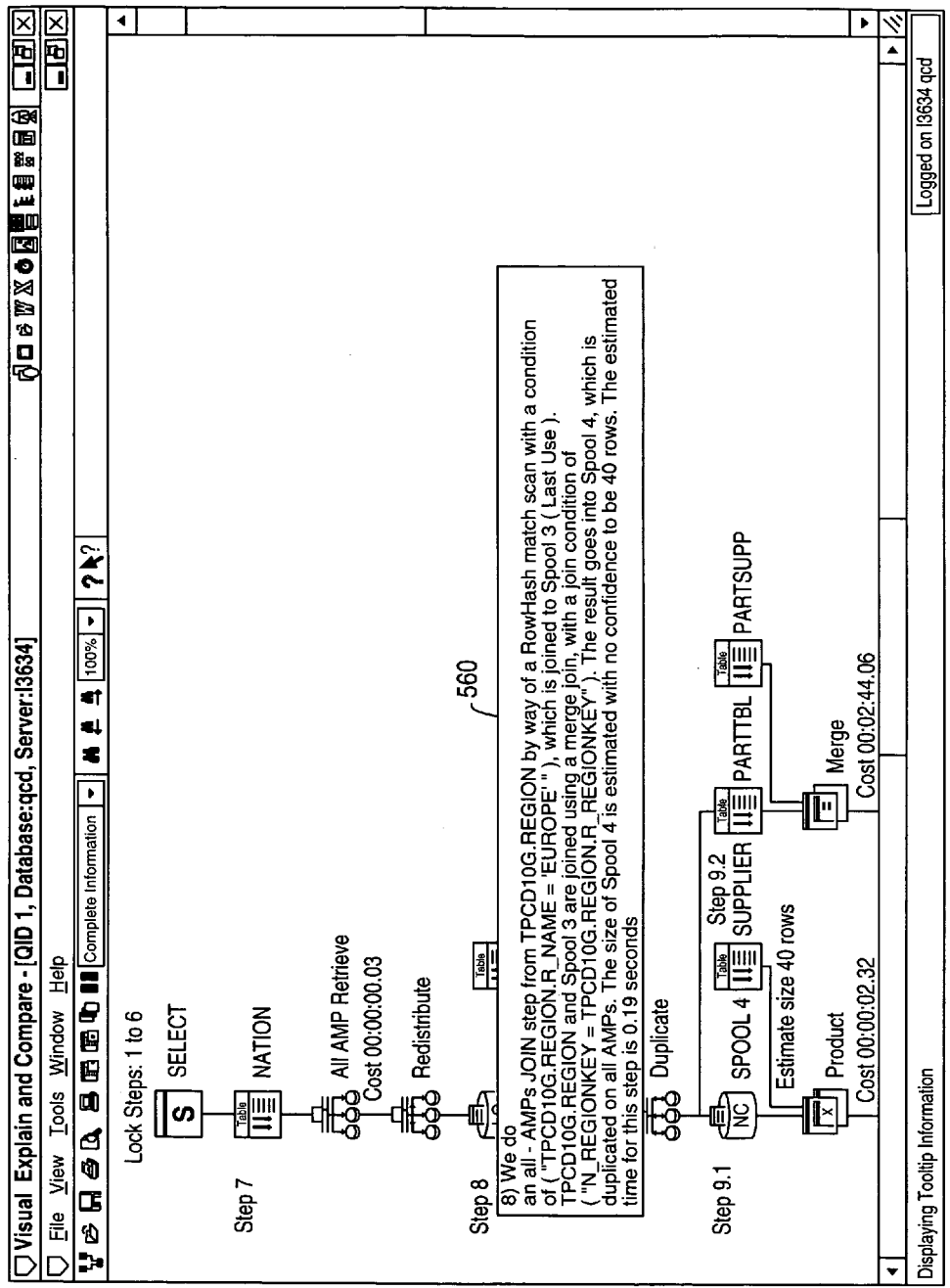

In FIG. 16, a screen 530 displaying the detailed information associated with the AllAMPRetrieve icon 436 is illustrated. In FIG. 17, a screen 540 displays the detailed information associated with the Spool 3 icon 440. In FIG. 18, a screen 550 displays detailed information associated with the Region table icon 444. In FIG. 19, the detailed information associated with the merge-join icon 446 is displayed in a screen 560.

Figure 20:
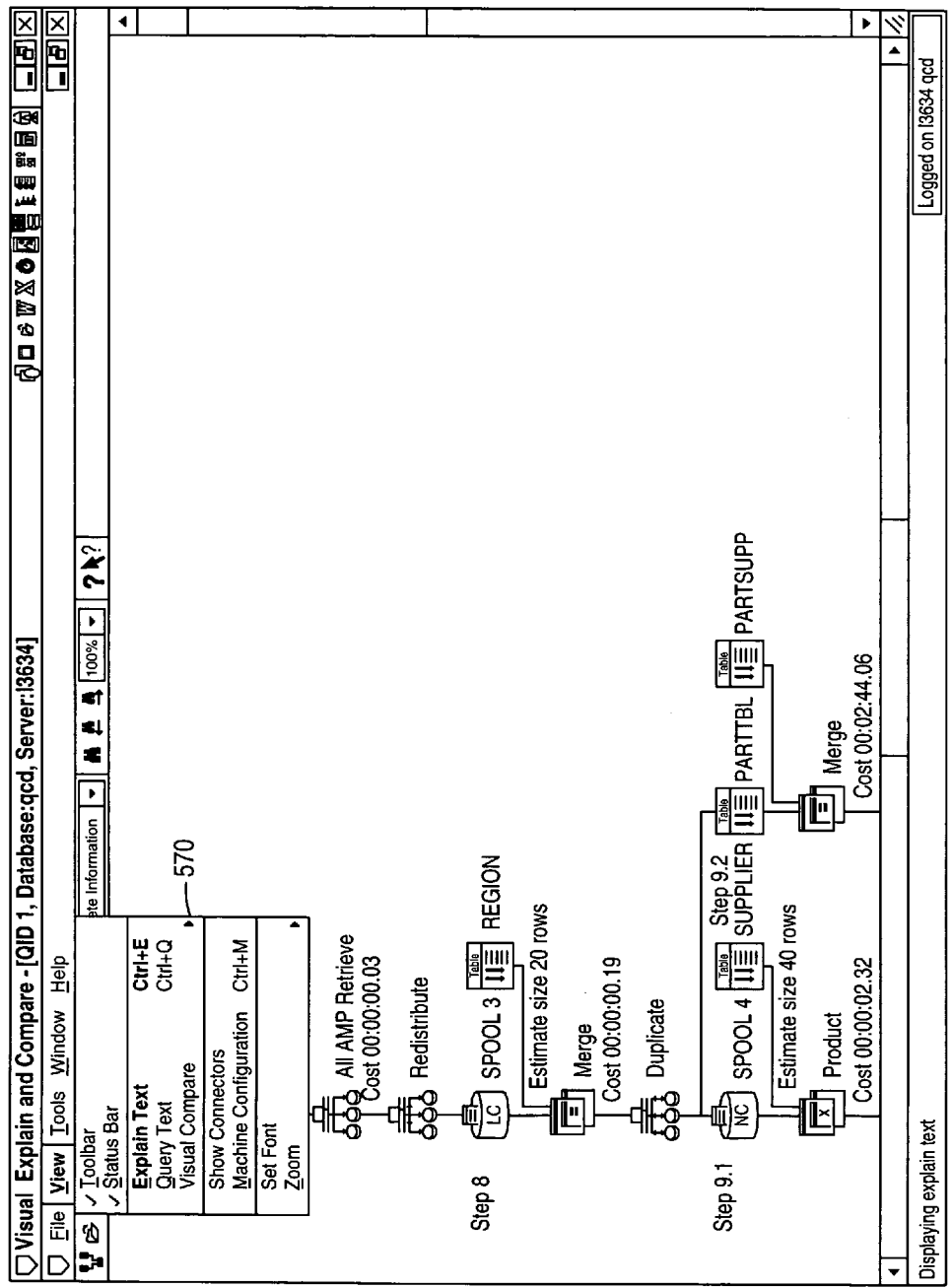
Figure 21:
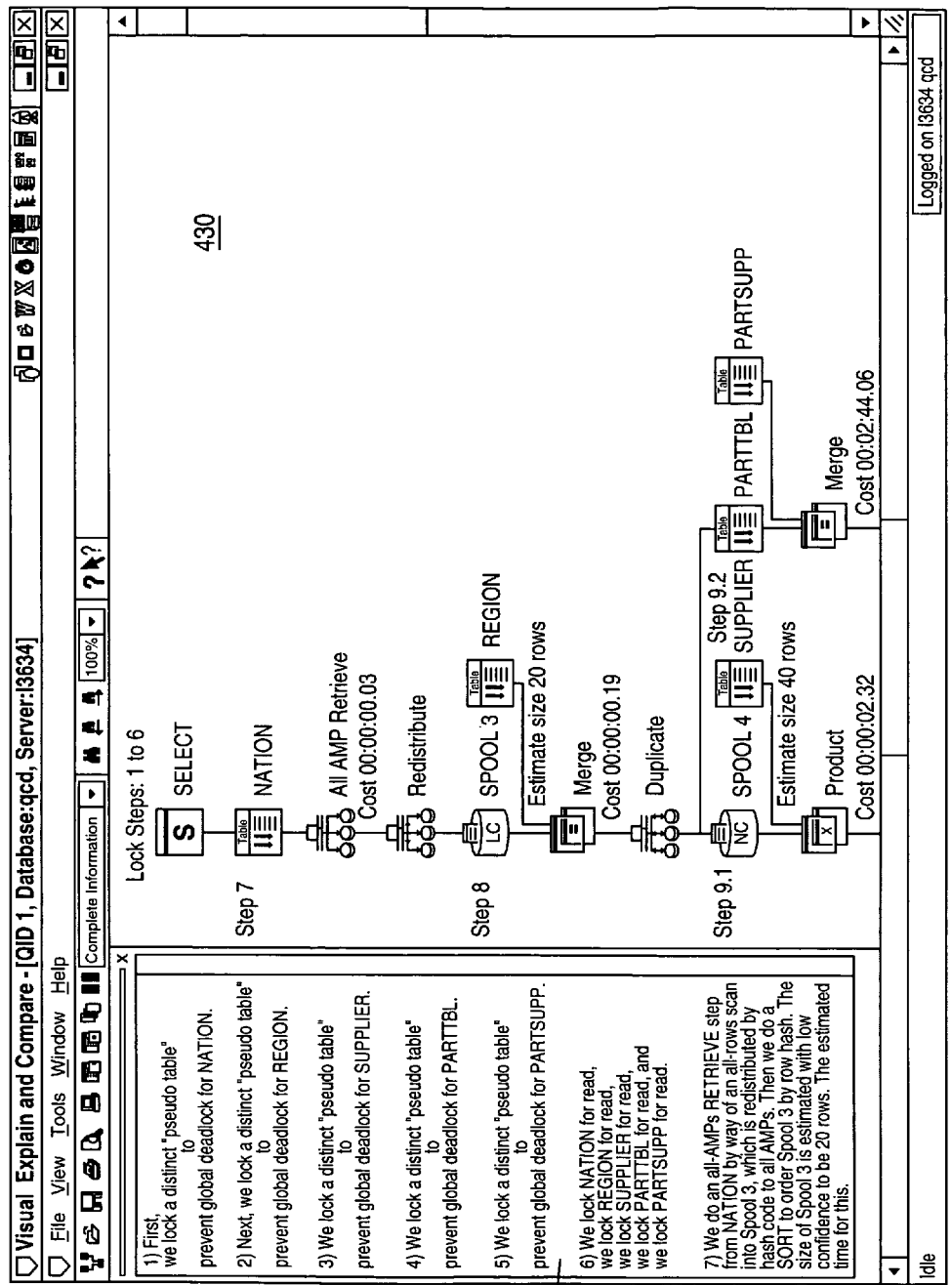
Figure 22:
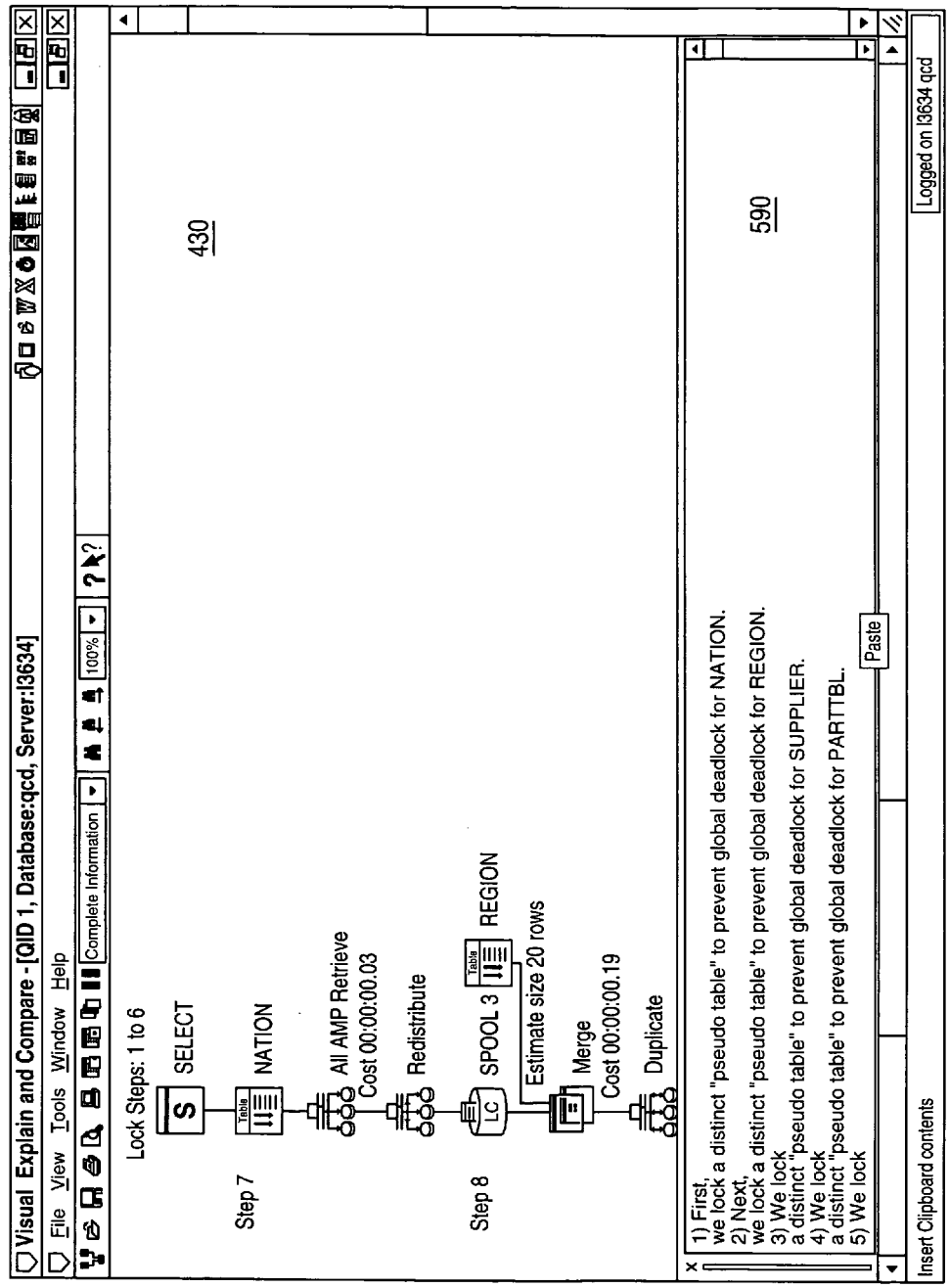

Another feature of the graphical user interface 318 provided by the visual explain and compare module 316 is the ability to concurrently view both the graphical representation and text description of a query execution plan. As shown in FIG. 20, an Explain Text command is selectable in a View menu 570. In response to selection of the Explain Text command, a box 580 is provided on the left side of the screen 430 (FIG. 21) to display the text corresponding to each step of the execution plan. Alternatively, as shown in FIG. 22, a box 590 is provided on the lower side of the screen 430 to display the text corresponding to each step of the execution plan.

Figure 23:
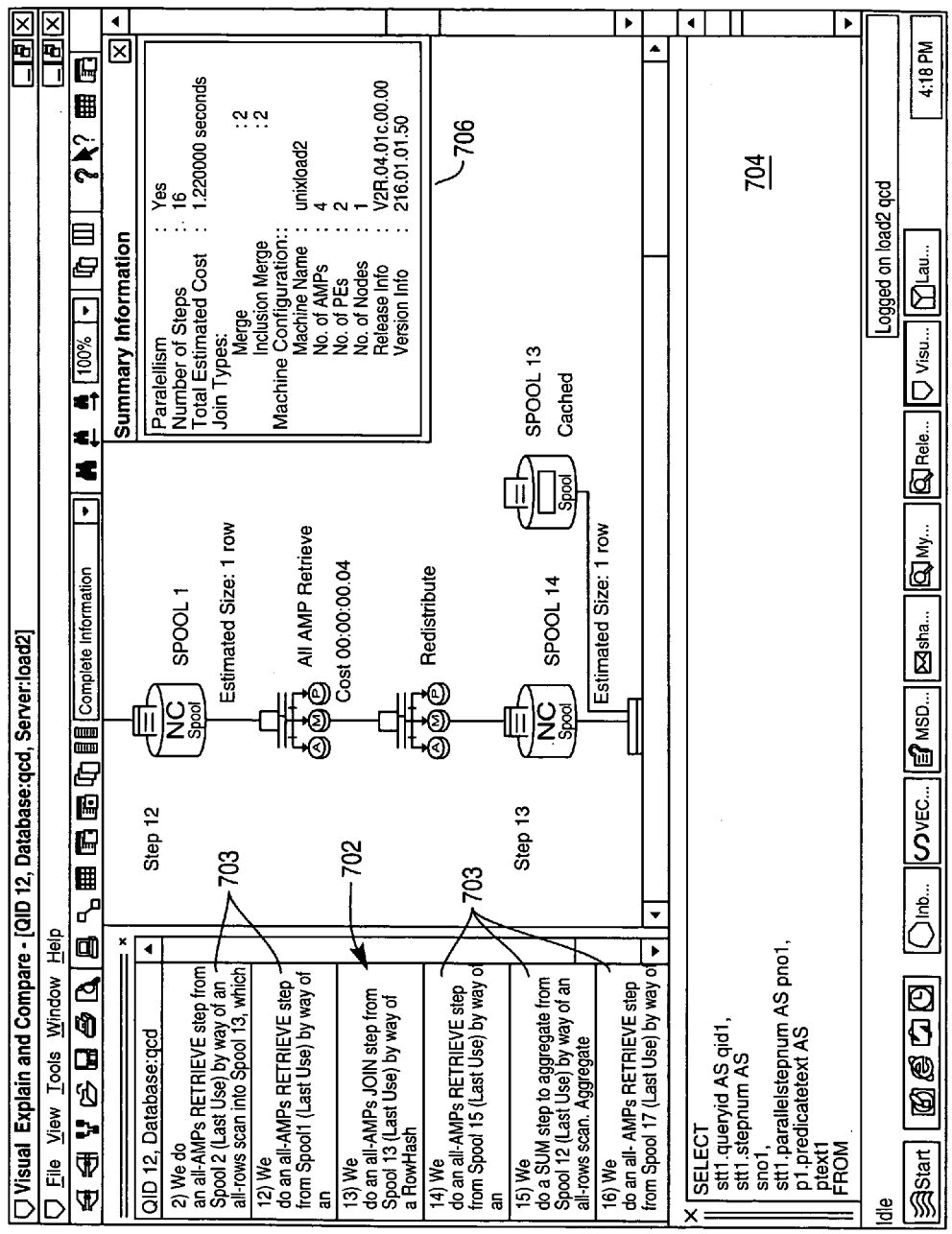

FIG. 23 shows a different format of displayed text corresponding to the steps of the displayed execution plan. A box 702 provided on the left side of the screen is subdivided into multiple sections 703, with each section 703 corresponding to one step of the execution plan. Optionally, a lower box 704 is also provided to display the query statement corresponding to the execution plan. Also, a Summary Information screen 706 contains summary information corresponding to the execution plan. The summary information according to the illustrated example indicates whether parallelism exists in the execution plan, the number of steps in the execution plan, the total estimated cost, the join types involved in the execution plan, and the machine configuration of the target system for which the execution plan is generated.

By correlating the text of each step with the corresponding icon of the graphically represented execution plan, a user is provided with a more complete picture of what is going on at each step. Also, if desired, the specific SQL statement can be viewed in the box 704 and the environmental information of the target system for which the execution plan was generated can be displayed in a Summary Information screen 706. Also, as the user scrolls through the text in the box 702, the graphical representation scrolls along with the text, and vice versa.

Figure 24:
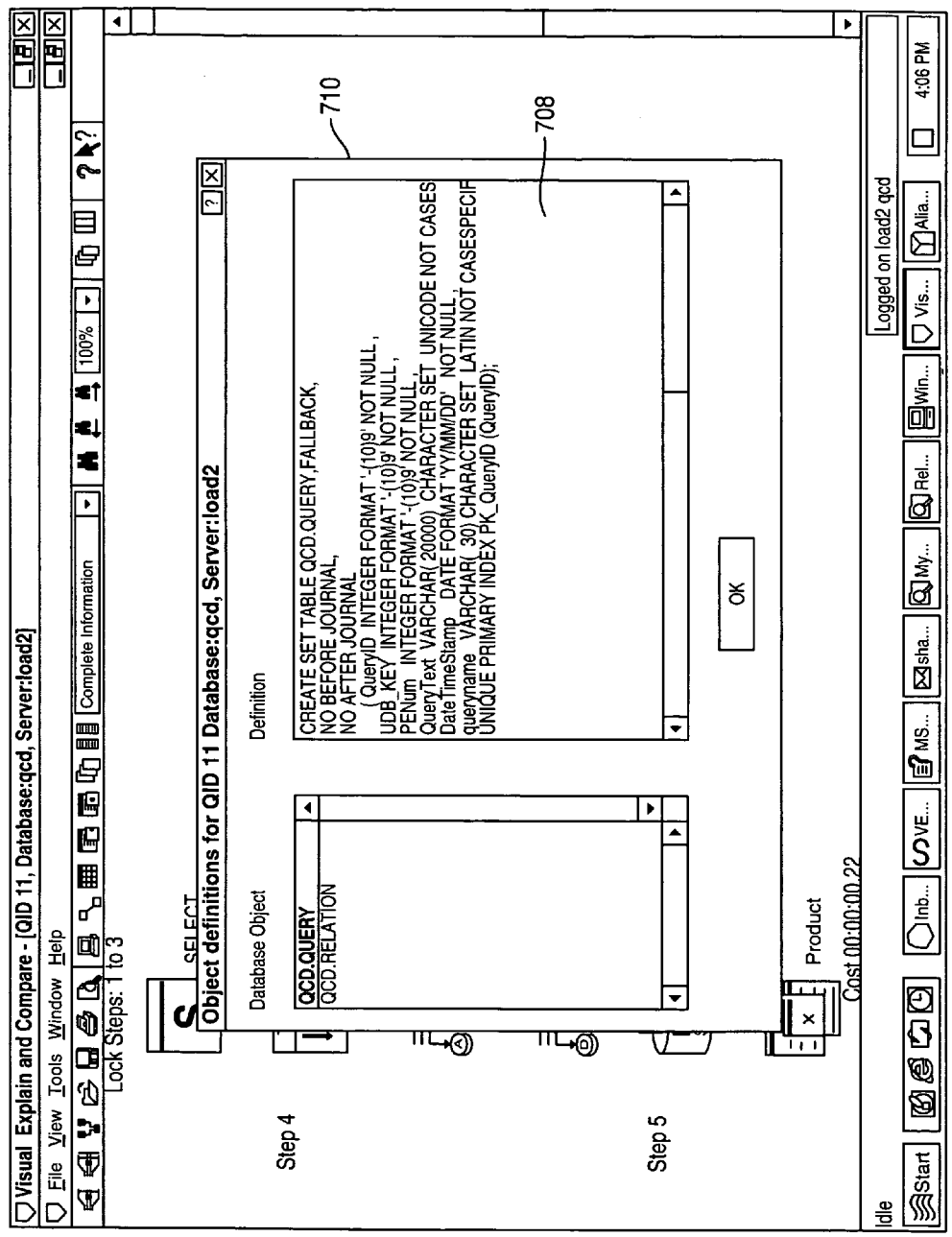

As shown in FIG. 24, another feature of the visual explain mechanism is the ability to capture and display the data definition of tables referenced in an execution plan. The data definition information is displayed in a box 708 of a pop-up screen 710. The data definition information is also referred to as table schema.

Figure 25:
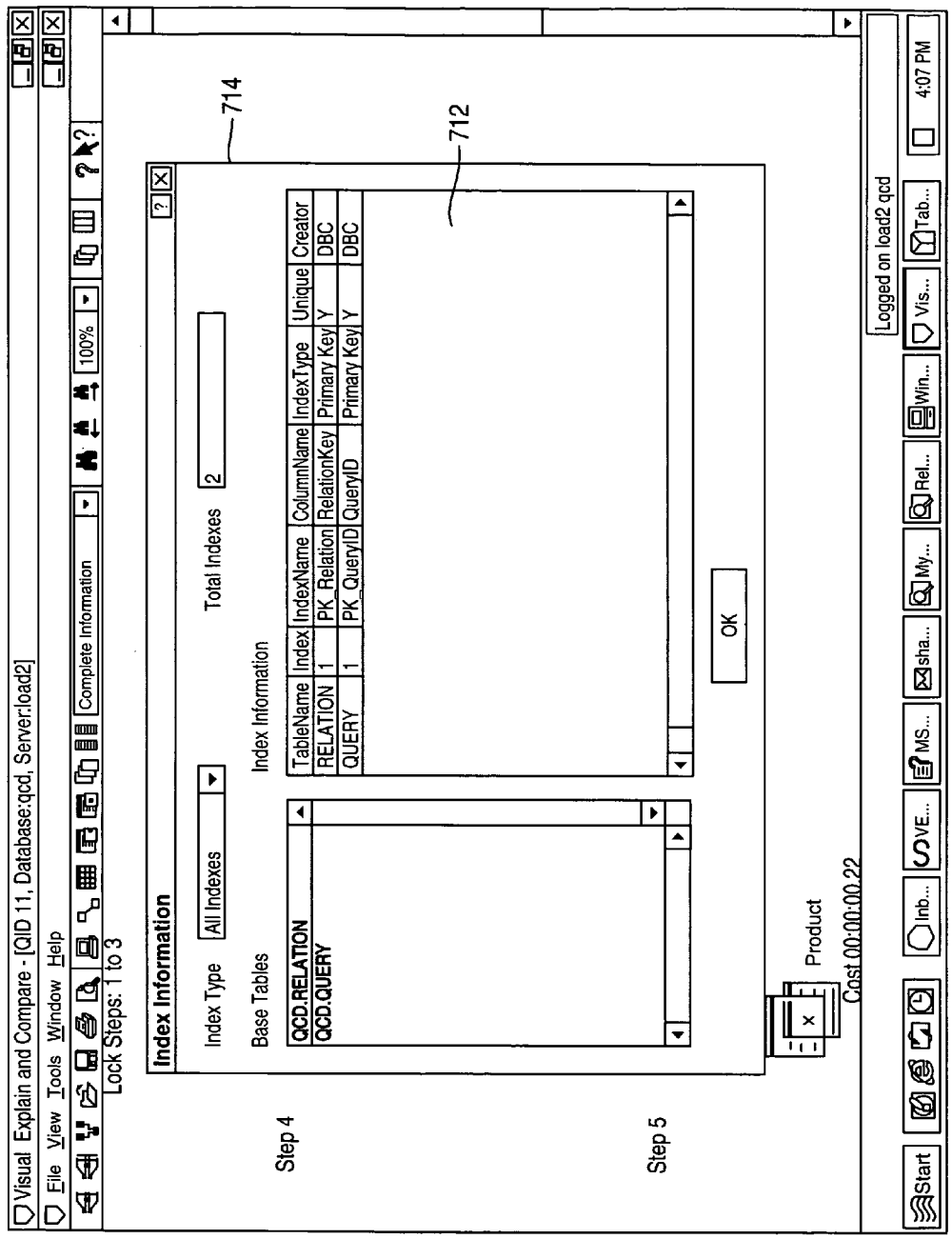

As shown in FIG. 25, another feature of the visual explain mechanism is the ability to capture indexes created on a table that is referenced in an execution plan. The captured indexes can also later be retrieved. The indexes are displayed in a box 712 of an index information pop-up screen 714.

Figure 26:
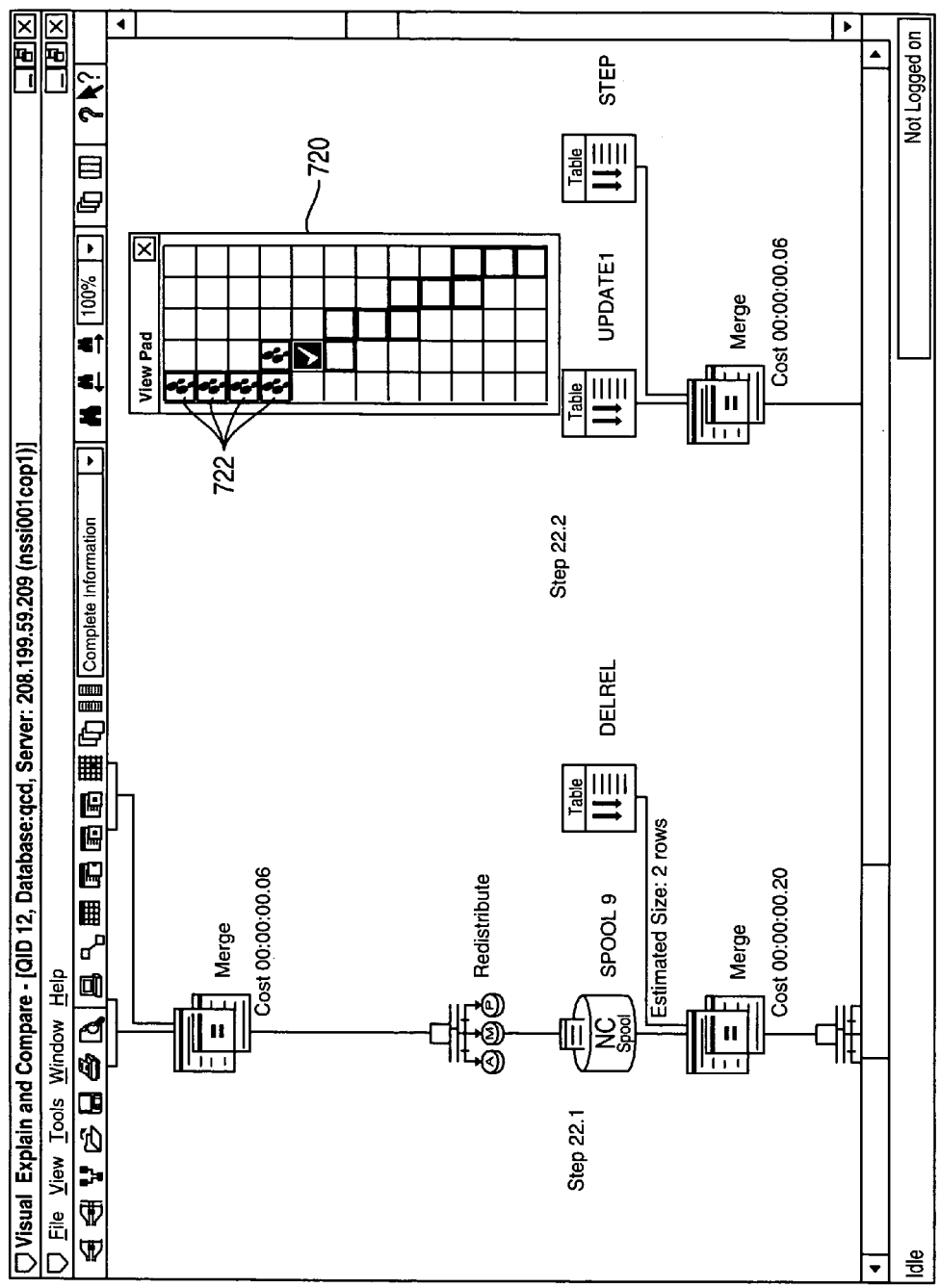

FIG. 26 illustrates use of a view pad screen 720 that allows a user to view the entire execution plan on a smaller interface. The view pad screen 720 includes a number of cells 722 that correspond to the pages of the execution plan. A footstep mark in a cell 722 indicates that the page has already been visited by a user. A check mark in a cell 722 indicates that the user is currently on that page.

Figure 27:
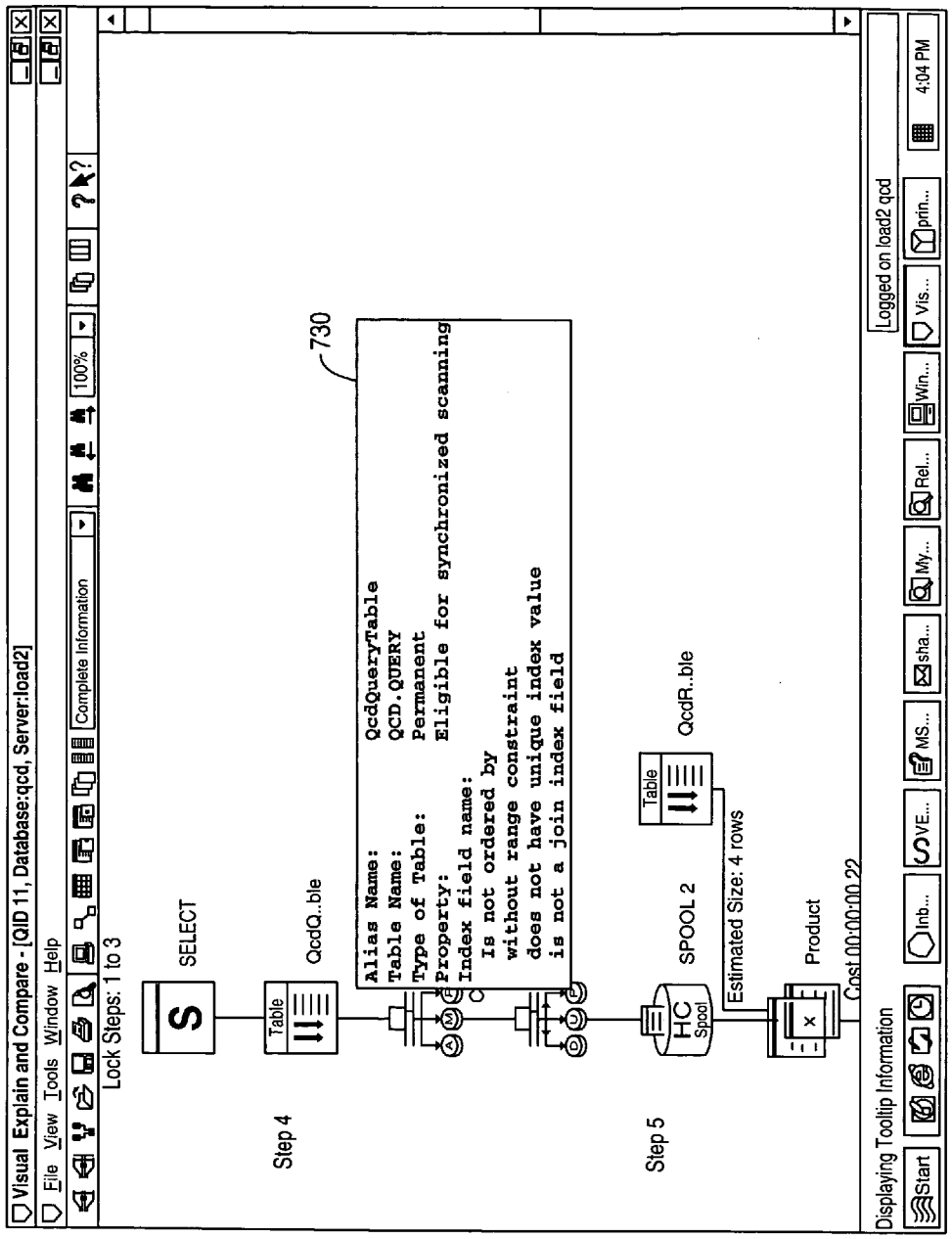

FIG. 27 illustrates a pop-up screen 730 that contains information to correlate a table depicted in the visual explain module interface to an "alias name" specified in the query. Thus, in the example, the pop-screen 730 contains an alias name "QcdQueryTable." The actual table name in the example is QCD.QUERY, which is also shown in the screen 730. Other information associated with the table are also displayed in the screen 730.

Figure 28:
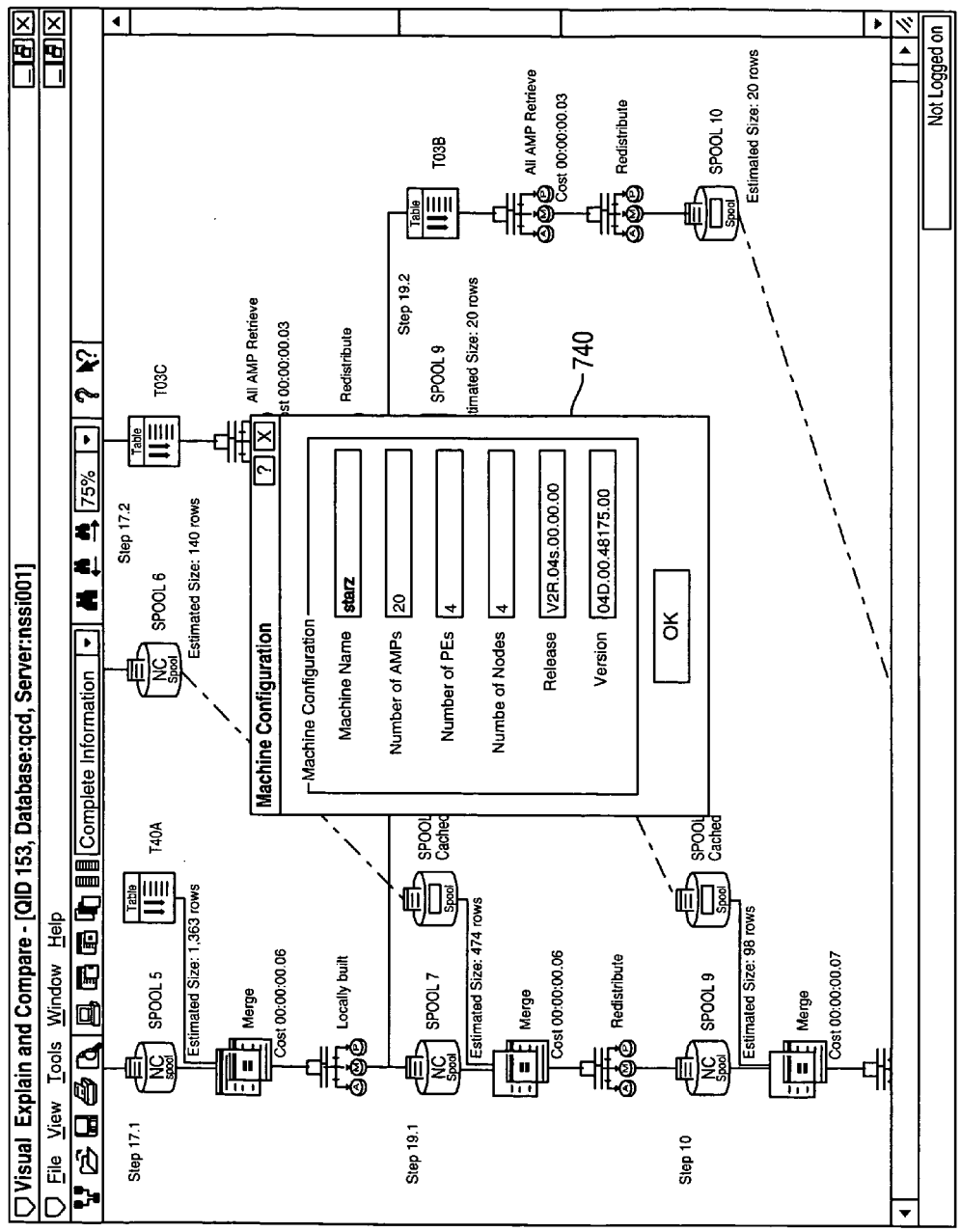

Another feature of the visual explain and compare module 316 is the ability to view the configuration of the target system. As shown in FIG. 28, a pop-up screen 740, referred to as a Machine Configuration screen, shows the configuration of the target system. In the example of FIG. 28, the machine name is "Starz," the number of AMPs is 20, the number of PEs is 4, and the number of nodes is also 4.

Figure 29:
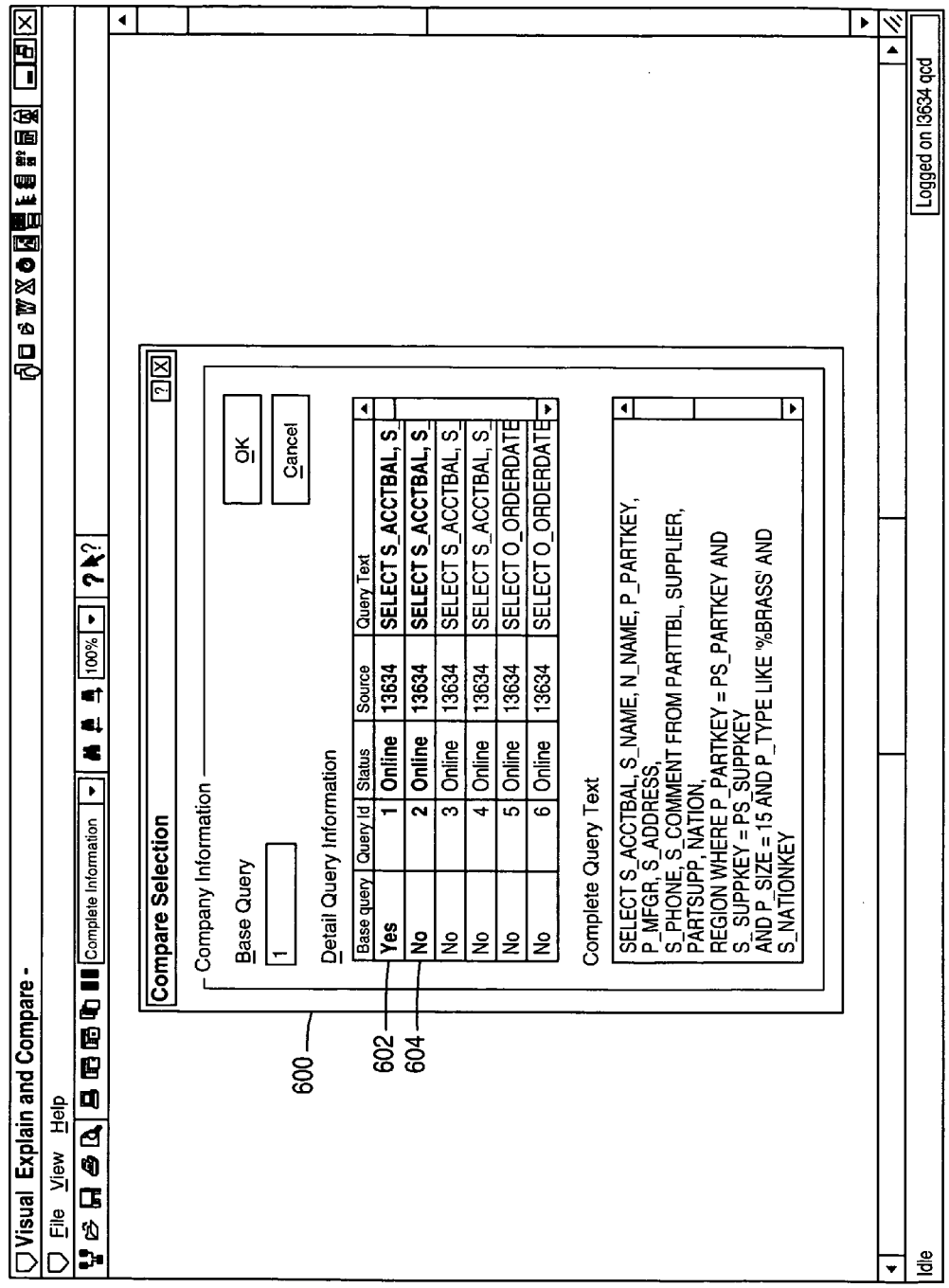

Referring to FIGS. 29-38, screens presented by the visual explain and compare module 316 for comparing query execution plans are illustrated. In FIG. 29, a "Compare Selection" screen 600 enables selection of a base query execution plan 602 and another query execution plan 604 to compare to the base query execution plan 602. The execution plans 602 and 604 correspond to the same query run under different conditions.

Figure 30:
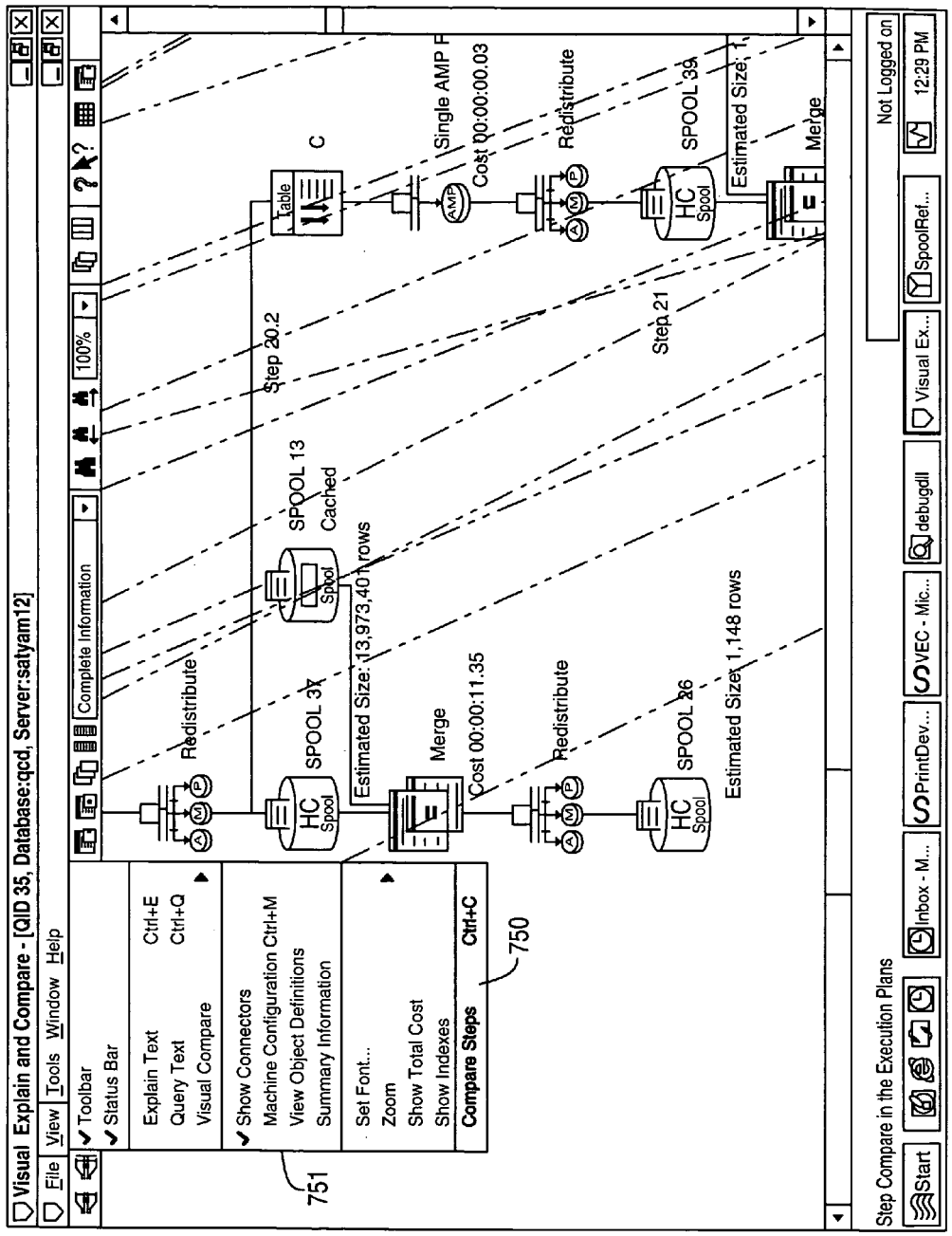

FIG. 30 shows a drop-down view menu 751 that includes as one of its elements a "Compare Steps" option 750 selectable by a user to invoke step comparison. In response to selection of the Compare Steps option 750, the screen 600 (FIG. 29) is displayed.

Figure 31:
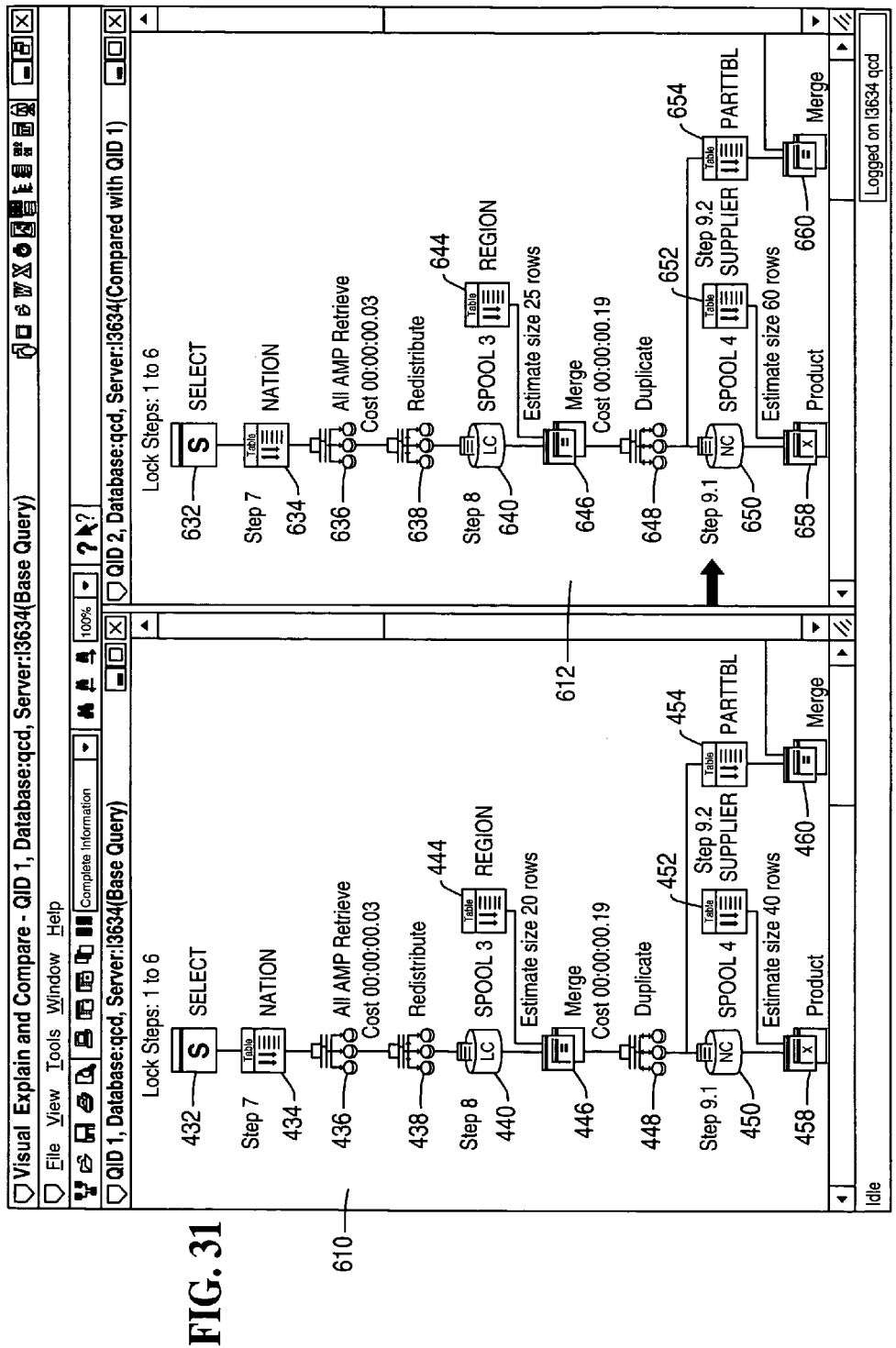

As shown in FIG. 31, in response to selection of query execution plans for comparison, the base execution plan 602 is displayed in a first screen 610 and the second execution plan 604 is displayed in a second screen 612. The base execution plan 602 is the same as the execution plan shown in FIG. 6 (and the steps are assigned the same reference numerals).

One technique of improving accuracy in estimating performance of a query is by adding statistics to columns of a table. Statistics include information on how data is structured in the database, the number of rows in a table, the data demographics of a table, and highest and lowest values of a column. Statistics may be sampled randomly from each node of a target system. Alternatively, statistics are collected on request by users and stored in some predetermined format, such as in a histogram.

In the execution plan 602 displayed in screen 610, none of the tables contain statistics, while in the execution plan 604 displayed in screen 612, statistics are added to a column of a Nation table 634. With the statistics added to the Nation table 634, the number of estimated rows of a resultant table in Spool 3 (icon 640) is indicated as HC or "High Confidence." The estimated number of rows for Spool 3 (icon 640) is 25, while the estimated number of rows for Spool 3 (icon 440) is 20, which is indicated as being LC or "Low Confidence." Because of the change to the Nation table 634, the estimated number of rows, 60, for the Spool 4 (icon 650) in the screen 612 is different from the estimated number of rows, 40, for the Spool 4 (icon 450) in the screen 610.

Figure 32:
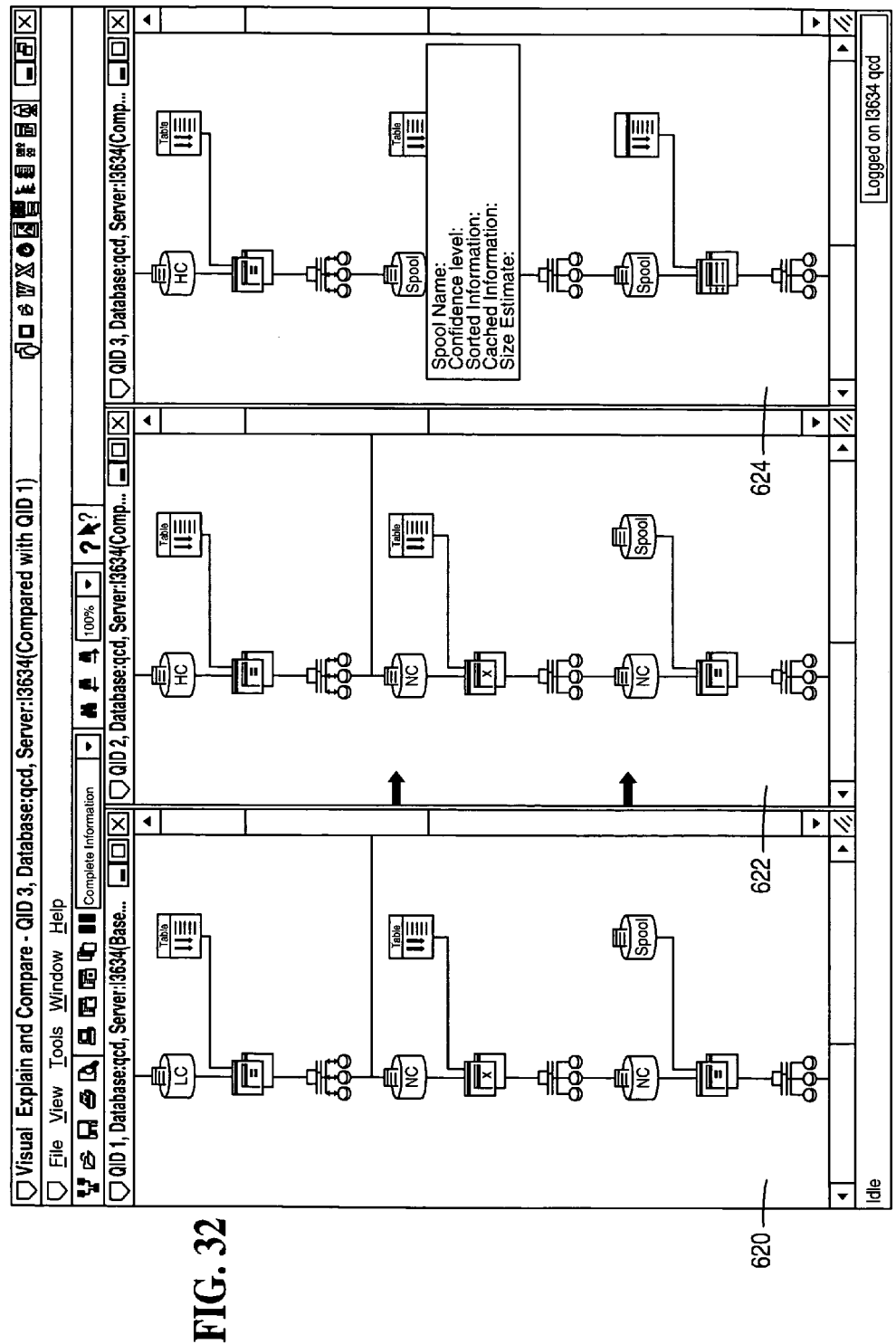

Referring to FIG. 32, three execution plans for a given query generated under three different conditions are displayed in respective screens 620, 622, and 624.

Figure 33:
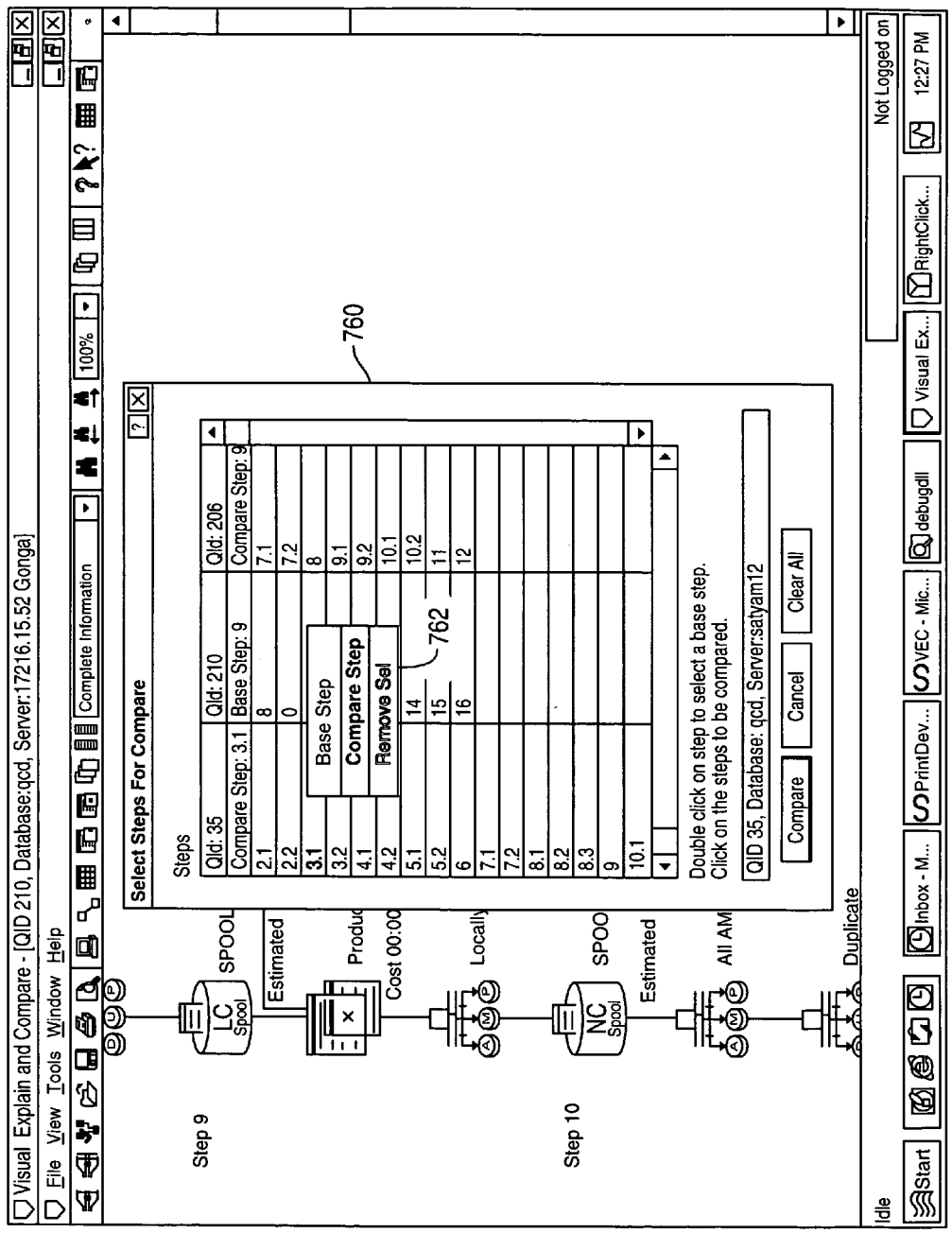
Figure 34:
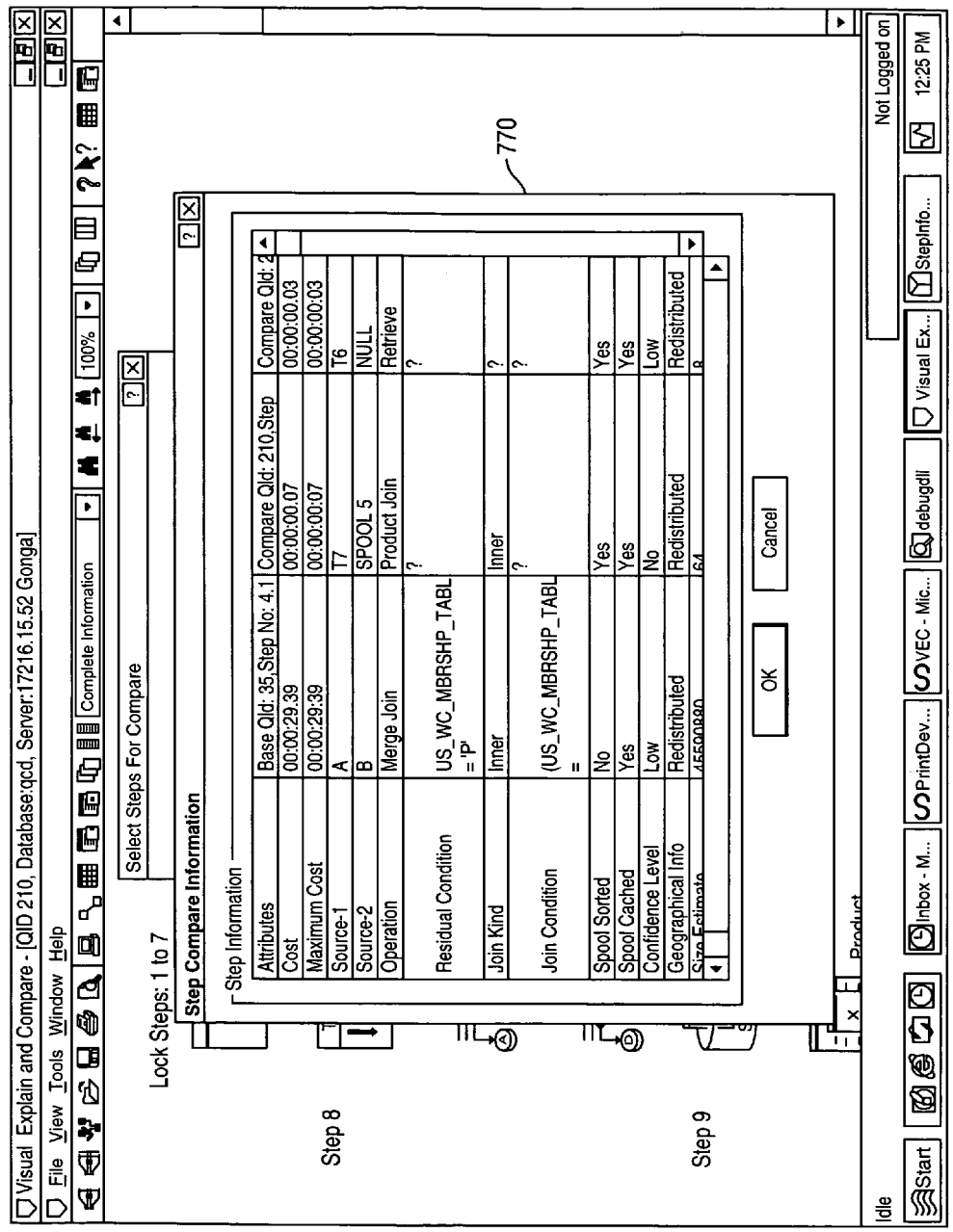

A further refinement of the ability to compare queries is the ability to compare specific steps of two different execution plans. This is accomplished, as shown in FIG. 33, in a screen 760, which lists the steps associated with execution plans that are being compared. In the example of FIG. 33, the screen 760 lists steps of three execution plans in three respective columns. The steps to be compared are highlighted and a "Compare Step" option 762 can be selected by a user to perform the step comparison. Upon selection of the steps to compare, the output is displayed in a "Step Compare Information" screen 770 (FIG. 34), which includes an attributes column (listing various attributes that are compared) and three other columns representing the values of each attribute for the selected steps of the different execution plans.

Figure 35:
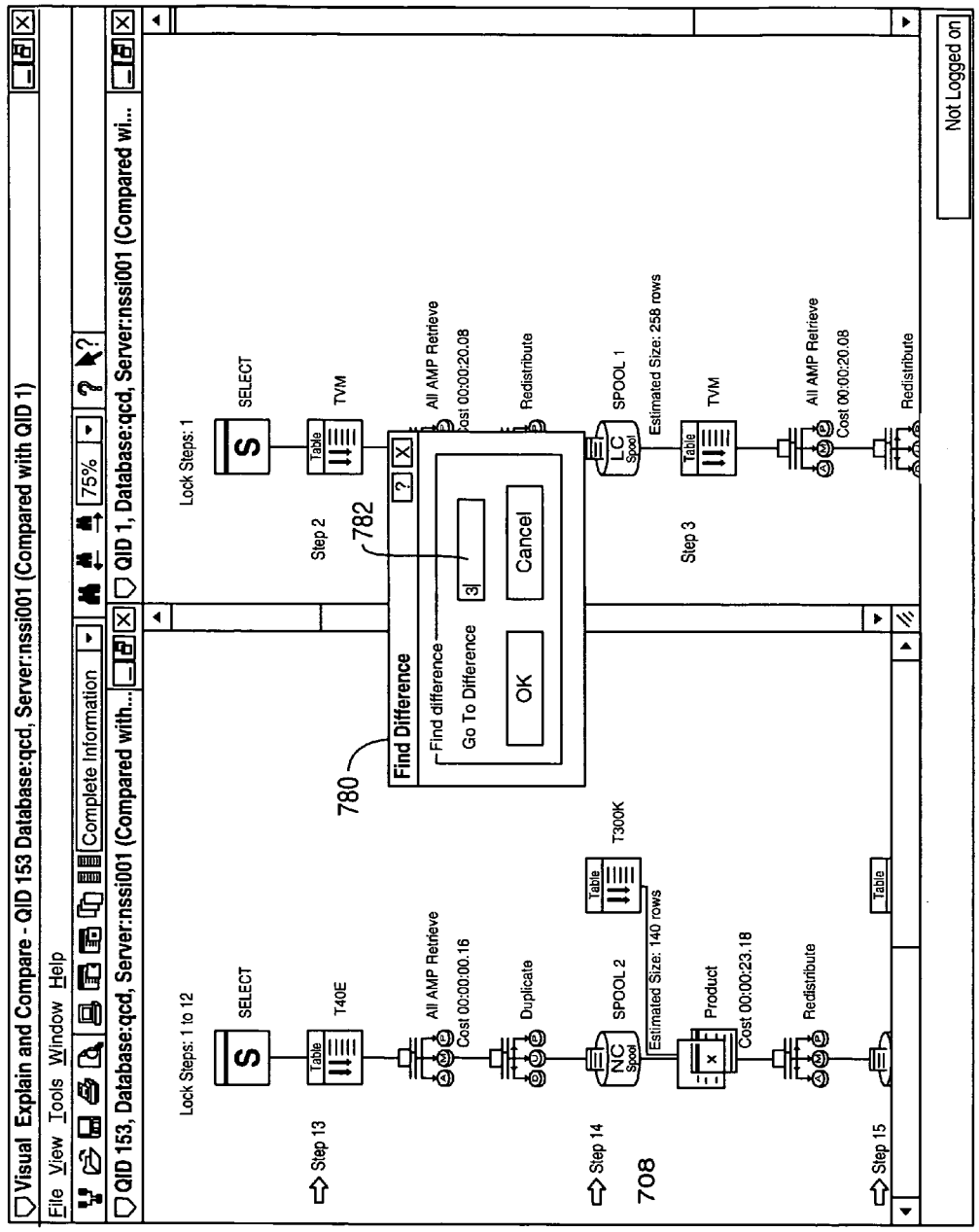

As another feature, FIG. 35 shows a "Find Difference" screen 780 that includes a box 782 in which a user can enter a value specifying the difference to go to. As shown in FIG. 36, in accordance with another embodiment, instead of displaying the comparison output in graphical format, the comparison output can be displayed in textual format. A table contains two sections, with a first section 800 containing the cost information associated with various steps of a base query execution plan, and a section 802 listing the costs associated with various steps of another query execution plan.

Figure 37:
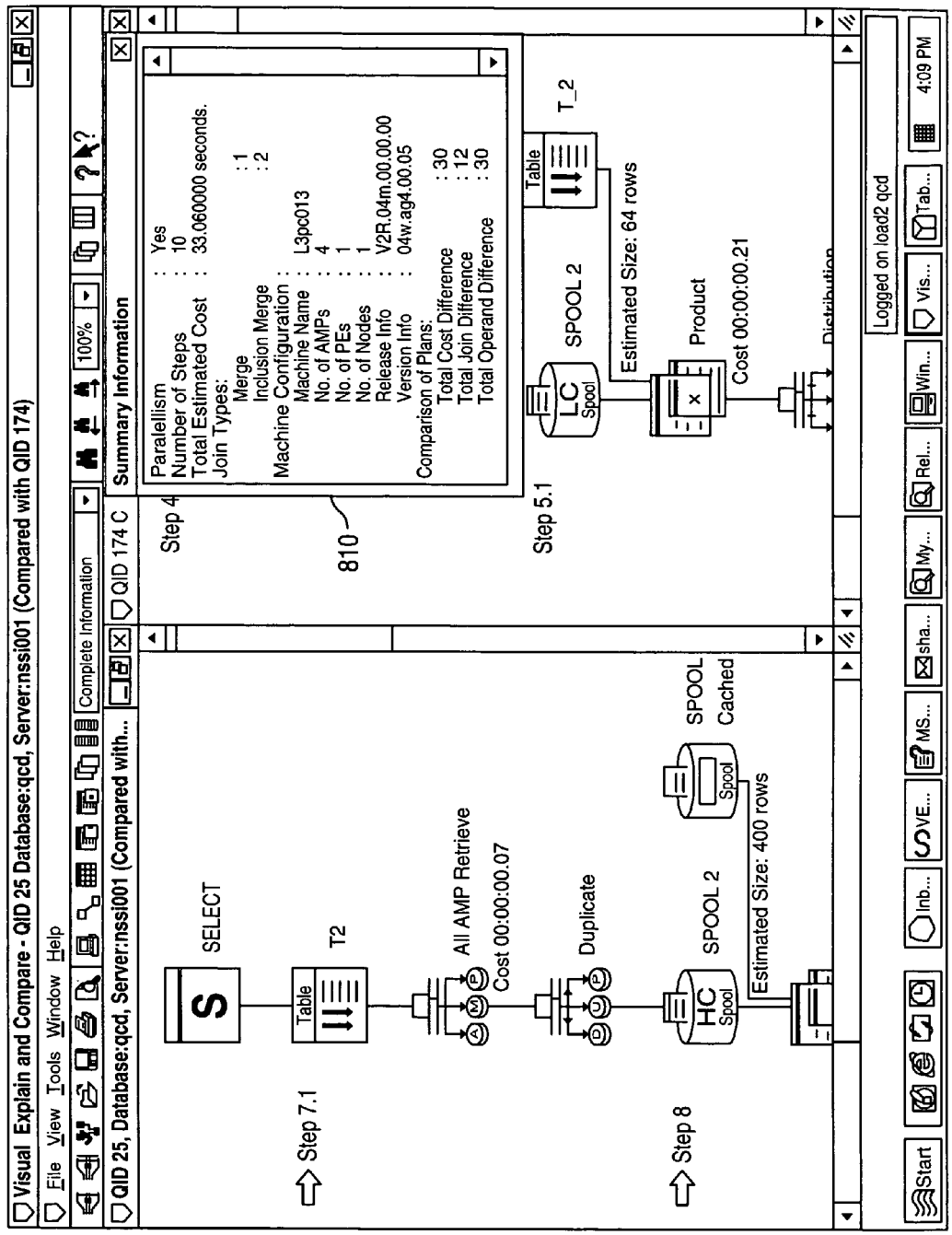
Figure 38:
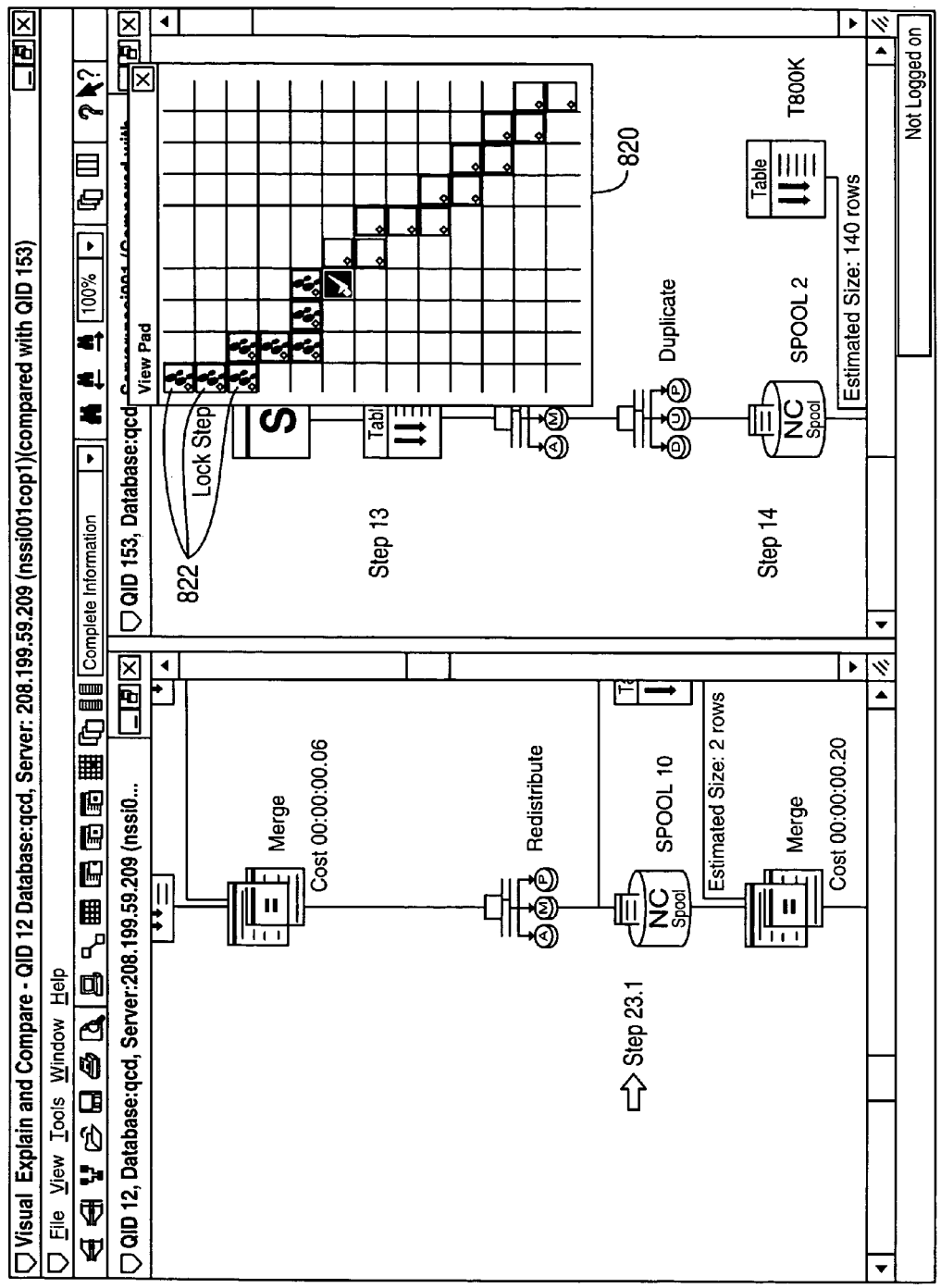

Summary information of a comparison can be displayed in a "Summary Information" screen 810, as shown in FIG. 37. The summary information indicates whether parallelism is performed, the number of steps, the total estimated costs, the join types, the target machine configuration, and a section that provides information relating to the comparison of the plans, such as the total cost difference, total join difference, and total operand difference.

A view pad screen 820 can also be used (FIG. 38) to depict the entire comparison, with various cells 822 representing different pages of the comparison output. Footsteps indicate pages that have been visited and a check mark indicates the current page.

The visual explain and compare module 316 of some embodiments of the invention provides for improved capabilities in analyzing performance of query execution plans. For complex execution plans, conventional explain text is often difficult to read and understand. With the graphical output of the visual explain and compare module, a more user-friendly interface is provided in which query execution plans may be analyzed. Further, plural execution plans of a query generated under different conditions may be displayed concurrently to enable a user to compare the execution plans for differences. Various other features are also provided to enhance flexibility of use and user convenience.

Figure 39:
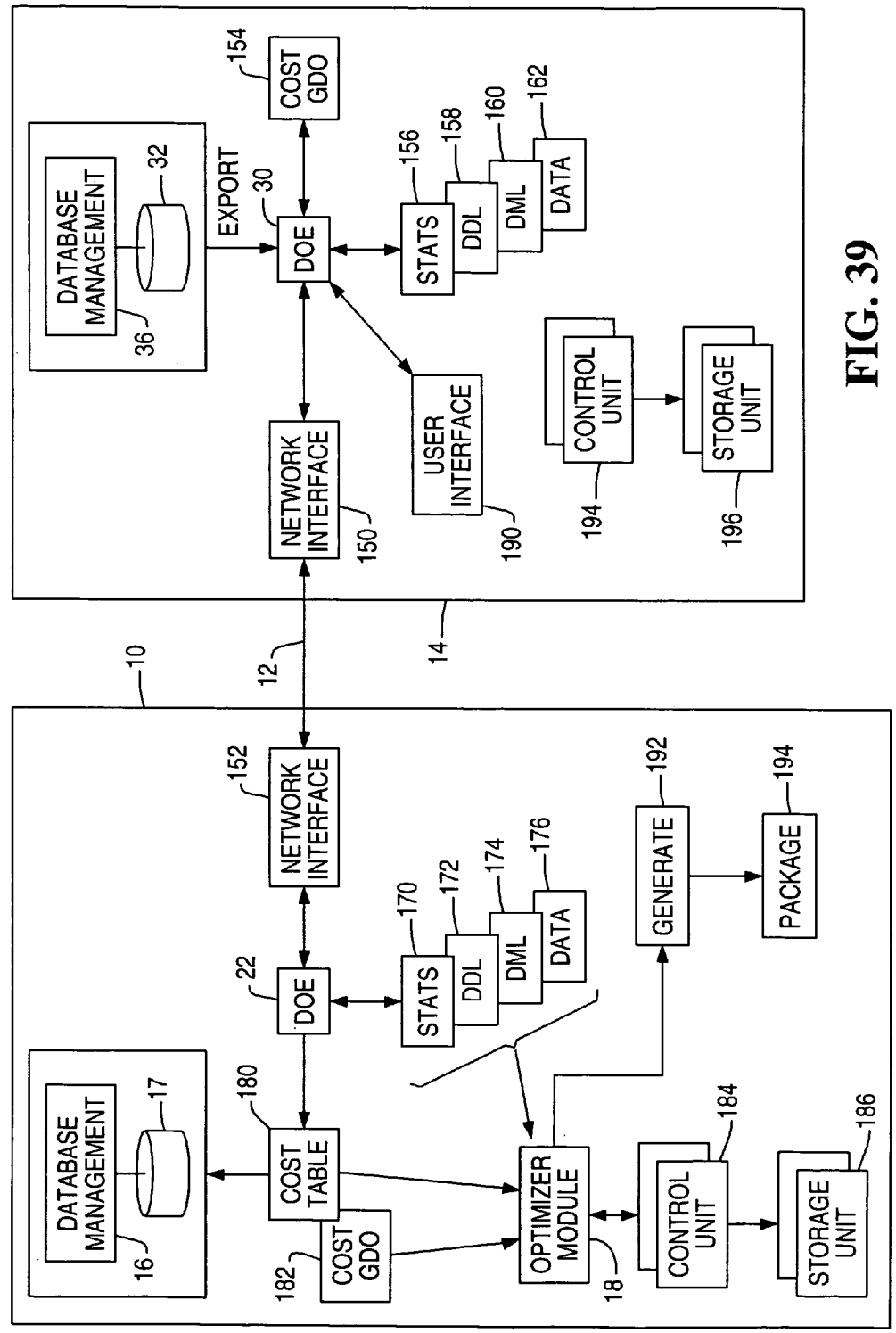
FIG. 39 is a block diagram of components of a target system and the test system of FIG. 1.

Referring to FIG. 39, components of the target system 14 and the test system 10 are illustrated in greater detail. As discussed above, the target system 14 contains various database-level information, including statistics 156, DDL statements 158, DML statements 160, and actual data 162 associated with the database 32. In addition, cost-related information may be contained in configuration files 154. In one embodiment, the configuration files 154 are referred to as cost global distributed objects (GDO).

Figure 40:
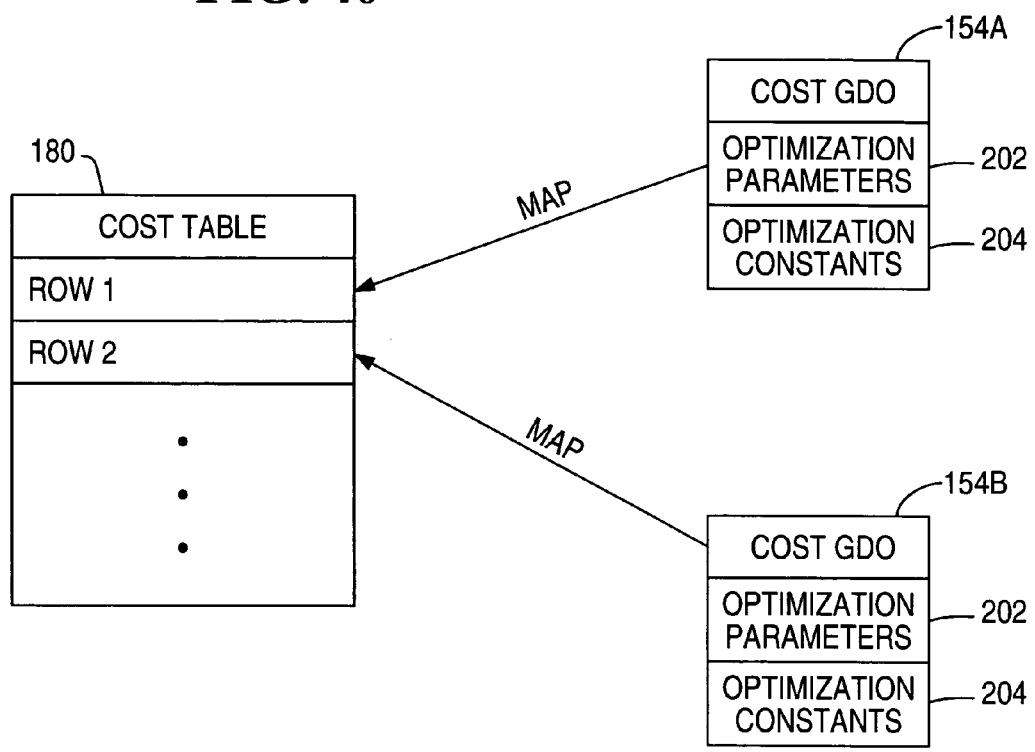
FIG. 40 illustrates configuration data and a cost table stored in respective target systems and the test system of FIG. 39.

As further shown in FIG. 40, the cost GDO 154 contains cost parameters 202 and cost constants 204 that may affect performance of various queries. FIG. 40 shows two cost GDOs 154A and 154B associated with respective target systems 14A and 14B. The cost parameters 202 include, as examples, the number of nodes of the corresponding system, the number of CPUs per node, the number of VPROCs per node, the amount of memory per VPROC, MIPS (millions of instructions per second) per CPU, disk array access speeds, disk access speeds, and network access speeds.

In addition to the optimization parameters 202, performance optimization constants 204 are also contained in the cost GDO 154. Performance optimization constants specify transfer rates for each kind of storage media and network interconnect in the target system. The target system 14 determines the values for the performance optimization constants at start-up and puts the appropriate sets of values into section 204 in the control GDO 154. Thus, for example, performance optimization constants may be specified for different types of disk arrays, such as disk arrays from different manufacturers or of different models. Although the illustrated embodiment shows the optimization parameters and optimization constants as separate components, the distinction may be removed in further embodiments.

To export or extract target information, the data object extractor 30 provides a user interface 190 through which a user may select desired information to export or dump into the test system 10. The user interface 190 may, for example, provide command lines, graphical user interface icons, and so forth to access the desired information in the target system 14. For example, the cost parameters 202 and performance optimization constants 204 may be extracted into one or more files (such as in binary format or in some other format) for communication through network interfaces 150 and 152 in respective systems 14 and 10 over the network 12. Desired statistics 156, DDL statements 158, DML statements 160, and user data 162 may also be extracted and communicated across the network 12 to the test system 10.

Figure 41:
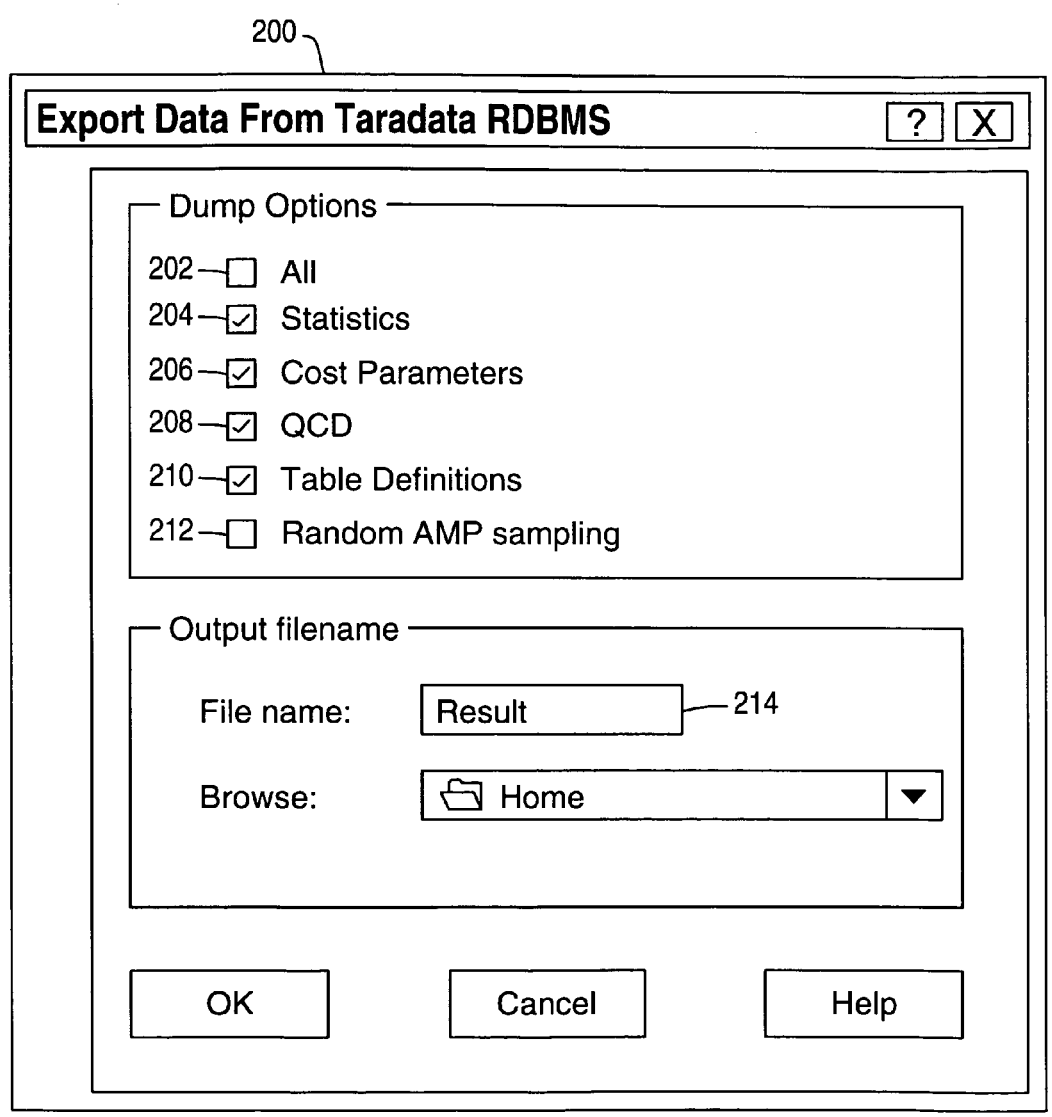
FIG. 41 illustrates an Export Data window to capture selected environment information of a target system, in accordance with an embodiment.

Referring further to FIG. 41, an Export Data window 200 that is part of the user interface 190 is illustrated. The Export Data window 200 allows the user to select the desired types of data to capture. One option is an "ALL" option 202, which causes the data object extractor 30 in the target system 14 to capture all selectable types of environment information. Alternatively, individual types of environment information may be selected by selecting a "STATISTICS" option 204 (to capture statistics data), a "COST PARAMETERS" option 206 (to capture cost-related information), a "QCD" option 208 (to capture query capture database information, which are databases that contain query information), a "TABLE DEFINITIONS" option 210 (to capture DML and DDL statements), and a "RANDOM AMP SAMPLING" option 212 (to capture random AMP samples). A file name 214 can be selected to identify the file to which the captured information is dumped.

Referring again to FIG. 39, the extracted information received from the target system 14 (e.g., by electronic mail, file transfer, web download, etc.) is applied to appropriate locations in the test system 10 (e.g., relational tables, files, and other locations). For example, the extracted statistics, DDL statements, DML statements, and user data may be stored in locations 170, 172, 174, and 176, respectively, by the data object extractor 22 running in the test system 10.

In addition, by use of a diagnostic query statement, the data object extractor 22 maps the extracted cost information into a cost table 180, which is a relational table. In one embodiment, the diagnostic query statement, which is a SQL statement, includes a diagnostic Dump Costs statement. The diagnostic Dump Costs statement dumps the extracted cost information into rows of the cost table 180. Each row may correspond to one target system 14, as illustrated in FIG. 18. Thus, multiple rows of the cost table 180 correspond to multiple target systems 14. The Dump Costs statement specifies a target system name, which is a unique primary key entry into the cost table 180. The target system name identifies a row in the cost table 180.

Another SQL diagnostic query statement is a diagnostic Set Costs statement, which directs the optimizer module 18 in the test system 10 to use the environmental cost parameters as defined in the cost table 180 when performing optimization tasks. The Set Costs statement can also specify at which level optimization is to be performed. In one embodiment, separate levels are defined, including a Request level, a Session level, an IFP (interface processor) level, and a System level. When the Request level is selected, the optimizer module 18 is directed to use the appropriate values of the cost table 180 for the current request. When the Session level is selected, the optimizer module 18 is directed to use appropriate entries of the cost table 180 for the current user session. A system has multiple sessions, with one session assigned to each user of the system. In a session, multiple requests can be issued. When the IFP level is selected, the optimizer module 18 is directed to use the cost table 180 for the current IFP. When the system level is selected, the optimizer module 18 is directed to access a row of the cost table 180 to create a cost GDO 182. Effectively, at the system level, the cost information transferred from the target system 14 is used by the optimizer module 18 for the entire system, for all IFPs, for all sessions, and for all requests. Different entries (or combinations of entries) in the columns of a given row of the cost table 180 are used depending on which level is selected.

The optimizer module 18 includes cost functions that are called to perform optimization tasks. The cost functions are used to determine costs based on the environment attributes, which have been downloaded from the target system 14. For example, the costs functions may include a FindNumBlocks function, which calculates the number of blocks in a relation. Another function is the DiskCost function, which calculates the cost of disk operation. A VAMPsPerCPU function returns the number of VAMPs for an operation. A VAMPsPerPMA function 214 returns the number of VAMPs for each node. An OptRDup function 216 computes the cost of a row duplication. Various other cost functions also exist in the test system 10 that can be called by the optimizer module 18.

Some contents of each row of the cost table 180 are described below. A field TARGET_SYS_NAME is a unique primary value (unique primary key) to identify the target system. This primary key is used by the diagnostic Set Costs statement to identify the row from the cost table 180 that the optimizer module 18 is to use. Another entry of the cost table 18 identifies the type of the target system. Another parameter, OptAmpCnt specifies the number of nodes in the target system, and a parameter IFPCnt specifies the number of IFPs in the system. An OptSysCPUWeight field defines the system assigned weight to the CPU contribution for the optimization of a request. A field OptSysDiskWeight defines the system assigned weight to the disk contribution for the optimization of a request. A parameter OptSysNetWeight defines the system assigned weight to the network contribution for the optimization of a request. A parameter OptRowAccessCost field defines the cost of accessing a row in memory. A parameter OptOutputRowCost field defines the overhead cost for building an output row. A field OptRedistributeCost defines the cost of redistributing a row.

In addition, a field OptCPUsPerPMA defines a number of CPUs in a processor module assembly (PMA), or node. A field OptVampsPerPMA defines the number of VAMPs in a node. A field OptVampsPerCPU defines the number of VAMPs per CPU. A field OptPMAsPerDiskArray defines the number of nodes connected to a disk array. Numerous other entries may be defined in the cost table 18.

The various entries listed above are provided for purposes of illustration only, and are not intended to limit the scope of the invention. The type of entries that are contained in the cost table 180 is implementation-specific, and depends on how the optimizer module 18 is designed. Different types of optimizer modules may utilize different types of cost information and thus the cost entries in the cost table 180 may vary in different embodiments.

The various software modules or routines discussed herein, such as the optimizer module 18, the data object extractor 22 and 30, and other software modules or routines are executable on corresponding control units. For example, as shown in FIG. 39, software modules or routines may be executable on one or more control units 184. Instructions and data associated with the software modules or routines are stored in one or more storage units 186. Similarly, software modules or routines are executable on one or more control units 194 in the target system 14. Instructions and data associated with the software modules or routines are stored in one or more storage units 196. Each control unit includes a microprocessor, a microcontroller, a processor card (including one or more microprocessors or microcontrollers), or other control or computing devices. As used here, a "controller" can refer to either hardware or software or a combination of both.

Each storage unit includes one or more machine-readable storage media for storing data and instructions. The storage media includes different forms of memory including semiconductor memory devices, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tapes; an optical media such as compact disks (CDs) or digital video disks (DVDs). Instructions that make up the various software layers, routines or modules in the various systems or nodes are stored in the respective storage units. The instructions, when executed by a respective control unit, calls the corresponding system to perform programmed acts.

The instructions of the software layers, routines or modules are transported to a system in one of many different ways. For example, code segments including instructions stored on floppy disks, CD or DVD media, a hard disk, or transported through a network interface card, modem, or other interface device are loaded into the system and executed as corresponding software layers, routines, or modules. In the loading or transport process, data signals that are embodied in carrier waves (transmitted over telephone lines, network lines, wireline links, cables, and the like), communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system, comprising:
   a graphical user interface; and
   a controller adapted to determine steps of a query execution plan in a parallel database system,
   the controller adapted to further display a graphical representation of a parallel execution of the steps of the query execution plan in the graphical user interface.

2. The system of claim 1, wherein the controller is adapted to determine the steps of the query execution plan in a multiprocessing platform having plural nodes, the parallel database system comprising the multiprocessing platform having plural nodes.

3. The system of claim 1, wherein the steps are displayed as icons in the graphical user interface.

4. The system of claim 3, wherein the icons comprise an icon representing a spool, the spool comprising a temporary storage location containing a result of an operation performed in the execution plan.

5. The system of claim 4, wherein the controller is adapted to display an element indicating reuse of the spool by two or more steps of the execution plan.

6. The system of claim 4, wherein the controller is adapted to display a report showing reuse of the spool by two or more steps of the execution plan.

7. The system of claim 4, wherein the controller is adapted to display a screen listing steps reusing the spool.

8. The system of claim 1, wherein the controller is adapted to display a screen to enable selection of an execution plan, the screen displaying plural queries.

9. The system of claim 1, wherein the controller is adapted to display a screen to enable selection of an execution plan, the screen displaying files containing queries.

10. The system of claim 1, wherein the controller is adapted to display summary information in the graphical user interface indicating one or more of the following: whether parallelism is used, number of steps in the execution plan, types of join operations, and configuration of the parallel database system.

11. The system of claim 1, wherein the controller is adapted to display table definition information pertaining to a table involved in the execution plan.

12. The system of claim 1, wherein the graphical representation contains plural pages, and wherein the controller is adapted to display a screen in the graphical user interface containing plural elements, each element representing a different one of the plural pages.

13. The system of claim 12, wherein the elements contain a first indication to indicate that a page has been viewed.

14. The system of claim 1, wherein the controller is adapted to display a screen in the graphical user interface containing an alias name of a table used in a query associated with the displayed execution plan and an actual name of the table.

15. The system of claim 1, wherein the parallel database system comprises a platform, and wherein the graphical representation comprises icons selected from the group consisting of an icon representing a table, an icon representing an operation performed on a component of the platform, an icon representing a query statement, and icon representing an operation performed on two or more tables.

16. The system of claim 1, wherein the controller comprises an optimizer program.

17. The system of claim 1, wherein the controller is adapted to display a second graphical representation of a second execution plan in the graphical user interface to enable comparison of the first and second execution plans, the first graphical representation in a first screen and the second graphical representation in a second screen.

18. The system of claim 17, wherein the controller is adapted to display a selection screen listing steps of each of the first and second execution plans, the listed steps selectable to indicate steps of the two execution plans to compare.

19. A system, comprising:
   a graphical user interface; and
   a controller adapted to determine steps of a query execution plan in a parallel database system,
   the controller adapted to further display a graphical representation of a parallel execution of the steps of the query execution plan in the graphical user interface,
   wherein the controller is adapted to display a second graphical representation of a second execution plan in the graphical user interface to enable comparison of the first and second execution plans, the first graphical representation in a first screen and the second graphical representation in a second screen,
   wherein the controller is adapted to display a selection screen listing steps of each of the first and second execution plans, the listed steps selectable to indicate steps of the two execution plans to compare,
   wherein the controller is adapted to display output of the comparison of selected steps in the two execution plans in the graphical user interface.

20. An article comprising one or more storage media containing instructions that when executed cause a system to:
   determine steps of an execution plan of a query for a parallel database system;
   representing each step of the execution plan as an icon; and
   display, in a graphical user interface, an arrangement of the icons to represent parallel execution of the steps of the execution plan.

21. The article of claim 20, wherein the icons comprise an icon representing a spool, the spool comprising a temporary storage location containing a result of an operation performed in the execution plan, the instructions when executed causing the system to display an element indicating reuse of the spool by two or more steps of the execution plan.

22. The article of claim 21, wherein the instructions when executed cause the system to display a report showing reuse of the spool by two or more steps of the execution plan.

23. The article of claim 21, wherein the instructions when executed cause the system to display a screen listing steps reusing the spool.

24. The article of claim 20, wherein the instructions when executed cause the system to display summary information in the graphical user interface indicating one or more of the following: whether parallelism is used, number of steps in the execution plan, types of join operations, and configuration of the parallel database system.

25. The article of claim 20, wherein the instructions when executed cause the system to display table definition information pertaining to a table involved in the execution plan.

26. The article of claim 20, wherein the graphical representation contains plural pages, and wherein the instructions when executed cause the system to display a screen in the graphical user interface containing plural elements, each element representing a different one of the plural pages.

27. The article of claim 26, wherein instructions when executed cause the system to display a first indication associated with the element to indicate that a page has been viewed.

28. The article of claim 20, wherein the instructions when executed cause the system to display a screen in the graphical user interface containing an alias name of a table used in a query associated with the displayed execution plan and an actual name of the table.

29. The article of claim 20, wherein the instructions when executed cause the system to display a second arrangement of icons to represent a second execution plan in the graphical user interface to enable comparison of the first and second execution plans.

30. The article of claim 29, wherein the instructions when executed cause the system to display a selection screen listing steps of each of the first and second execution plans, the listed steps selectable to indicate steps of the two execution plans to compare.

31. An article comprising one or more storage media containing instructions that when executed cause a system to:

determine steps of an execution plan of a query for a parallel database system;

representing each step of the execution plan as an icon;

display, in a graphical user interface, an arrangement of the icons to represent parallel execution of the steps of the execution plan;

display a second arrangement of icons to represent a second execution plan in the graphical user interface to enable comparison of the first and second execution plans;

display a selection screen listing steps of each of the first and second execution plans, the listed steps selectable to indicate steps of the two execution plans to compare; and display output of the comparison of selected steps in the two execution plans in the graphical user interface.

* * * * *